United States Patent
Premysler

(10) Patent No.: US 8,680,754 B2
(45) Date of Patent: Mar. 25, 2014

(54) OMNIDIRECTIONAL LED LIGHT BULB

(76) Inventor: Philip Premysler, Washington, DC (US)

( * ) Notice: Subject to any disclaimer, the term of this patent is extended or adjusted under 35 U.S.C. 154(b) by 0 days.

(21) Appl. No.: 12/746,800

(22) PCT Filed: Jan. 15, 2009

(86) PCT No.: PCT/US2009/000244
§ 371 (c)(1),
(2), (4) Date: Sep. 1, 2010

(87) PCT Pub. No.: WO2009/091562
PCT Pub. Date: Jul. 23, 2009

(65) Prior Publication Data
US 2010/0314985 A1    Dec. 16, 2010

Related U.S. Application Data

(60) Provisional application No. 61/011,180, filed on Jan. 15, 2008.

(51) Int. Cl.
F21V 3/02 (2006.01)
F21V 5/04 (2006.01)

(52) U.S. Cl.
USPC .............................. 313/46; 362/294; 362/235

(58) Field of Classification Search
None
See application file for complete search history.

(56) References Cited

U.S. PATENT DOCUMENTS

| | | | |
|---|---|---|---|
| 3,978,332 A | 8/1976 | Goytisolo Taltavull | |
| 4,161,014 A | 7/1979 | Dey et al. | |
| 4,161,015 A | 7/1979 | Dey et al. | |
| 5,688,042 A | 11/1997 | Madadi et al. | |
| 5,899,557 A * | 5/1999 | McDermott | 362/244 |
| 5,971,551 A | 10/1999 | Winston et al. | |
| 6,573,536 B1 | 6/2003 | Dry | |
| 6,634,770 B2 * | 10/2003 | Cao | 362/294 |
| 6,793,374 B2 | 9/2004 | Begemann | |
| 6,837,605 B2 * | 1/2005 | Reill | 362/555 |
| 6,905,228 B1 * | 6/2005 | Takeyasu et al. | 362/237 |
| 7,049,746 B2 * | 5/2006 | Mano et al. | 313/512 |
| 7,273,299 B2 | 9/2007 | Parkyn et al. | |
| 7,387,403 B2 | 6/2008 | Mighetto | |

(Continued)

FOREIGN PATENT DOCUMENTS

JP    2004-296245 A    10/2004
KR    10-0881902 B1    1/2009

(Continued)

OTHER PUBLICATIONS

Machine English translation of JP 2004296245 to Yokoya et al.*

(Continued)

*Primary Examiner* — Sikha Roy
(74) *Attorney, Agent, or Firm* — Philip Premysler

(57) ABSTRACT

An LED light bulb has a hollow LED support/heat sink (222, 602, 702, 900, 802, 1002, 1102, 1216, 1404, 1502, 1606, 1906) with fins (234, 406, 604, 706, 804, 904, 906, 1008, 1106, 1620) extending internally and openings at two ends (230, 232, 1522). Heat generated by the LEDs (238, 908, 1242, 1624, 2504) is conducted through the heat sink fins and is removed by a convectively driven air flow that flows through the LED support/heat sink. LEDs are mounted on multiple external faces (236, 404, 910, 1524, 1622) of the LED support/heat sink thereby providing illumination in all directions. Lenses (1246, 2102, 2104) are provided for the LEDs to make the illumination highly uniform.

23 Claims, 13 Drawing Sheets

(56) References Cited

U.S. PATENT DOCUMENTS

| | | | |
|---|---|---|---|
| 7,434,964 B1 | 10/2008 | Zheng et al. | |
| 7,524,089 B2 | 4/2009 | Park | |
| 7,534,015 B2 | 5/2009 | Xu | |
| 7,563,005 B2 * | 7/2009 | Yatsuda et al. | 362/373 |
| 7,658,510 B2 | 2/2010 | Russell | |
| 7,731,395 B2 | 6/2010 | Parkyn et al. | |
| 7,985,004 B1 * | 7/2011 | Schach et al. | 362/276 |
| 8,297,799 B2 * | 10/2012 | Chou | 362/311.02 |
| 2002/0005826 A1 | 1/2002 | Pederson | |
| 2002/0021573 A1 * | 2/2002 | Zhang | 362/555 |
| 2002/0122309 A1 * | 9/2002 | Abdelhafez et al. | 362/294 |
| 2003/0189832 A1 * | 10/2003 | Rizkin et al. | 362/302 |
| 2006/0262424 A1 * | 11/2006 | Choi | 359/707 |
| 2007/0025109 A1 * | 2/2007 | Yu | 362/362 |
| 2007/0058369 A1 * | 3/2007 | Parkyn et al. | 362/235 |
| 2007/0084595 A1 * | 4/2007 | Lin et al. | 165/185 |
| 2008/0291663 A1 | 11/2008 | Wedell | |
| 2008/0316755 A1 | 12/2008 | Zheng | |
| 2009/0045933 A1 | 2/2009 | Smith et al. | |
| 2009/0059559 A1 | 3/2009 | Pabst et al. | |
| 2009/0195186 A1 * | 8/2009 | Guest et al. | 315/294 |
| 2009/0323325 A1 * | 12/2009 | Long et al. | 362/234 |

FOREIGN PATENT DOCUMENTS

| | | |
|---|---|---|
| KR | 10-0883344 B1 | 2/2009 |
| KR | 10-0922946 B1 | 10/2009 |
| WO | 2007/005003 A1 | 11/2007 |

OTHER PUBLICATIONS

Yi-Yung Chen1 and Allen Jong-Woei Whang "Design Method of Secondary Optical Element for LED Applications" SPIE vol. 7428, 74280E 2009.

Cree® XLamp® XP-C LEDs,CLD-DS19 Rev 8A, 2008-2012.

Luxeon Rebel General Purpose Datasheet DS64 (Sep. 10, 2007).

* cited by examiner

-PRIOR ART-

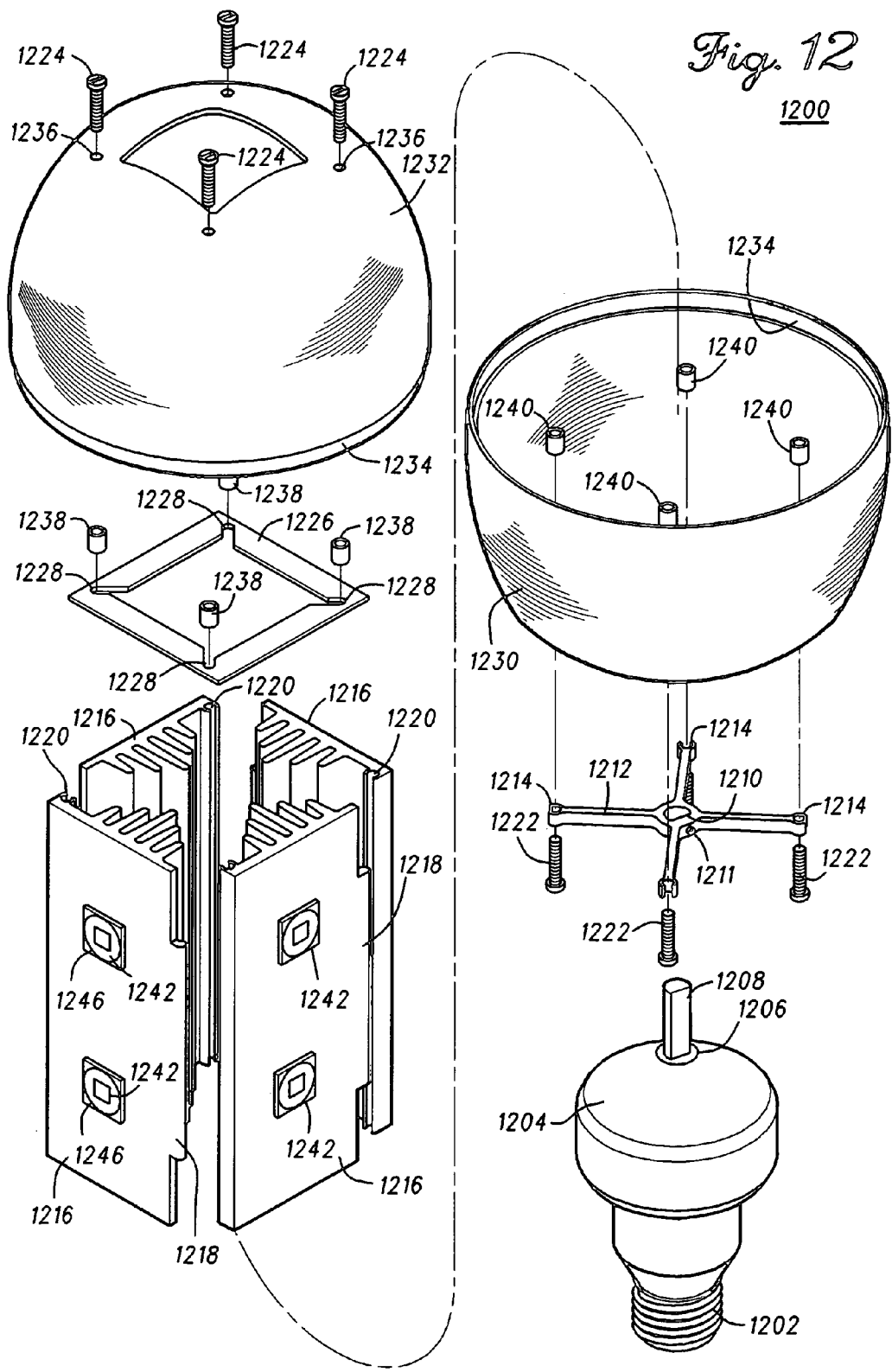

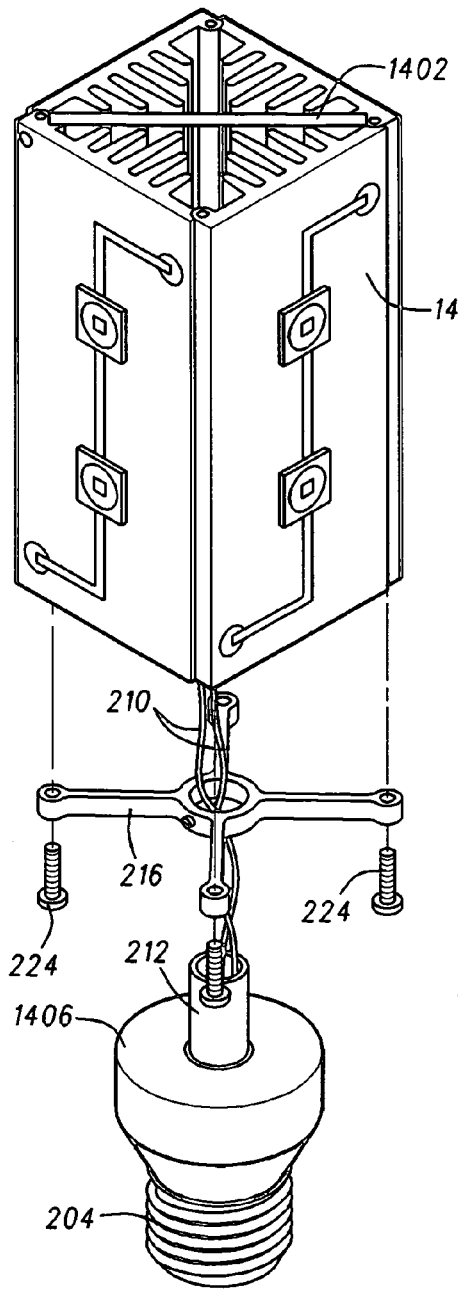
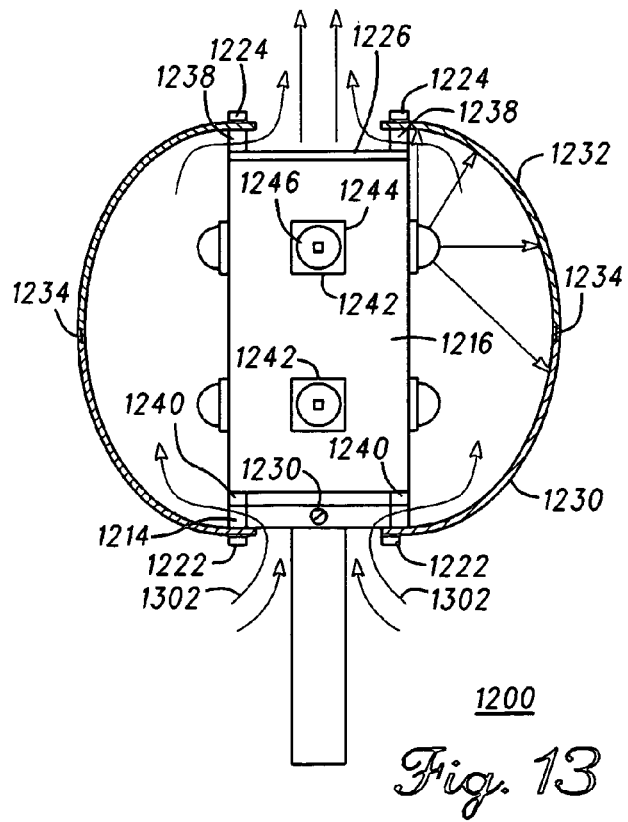
Fig. 14
Fig. 13

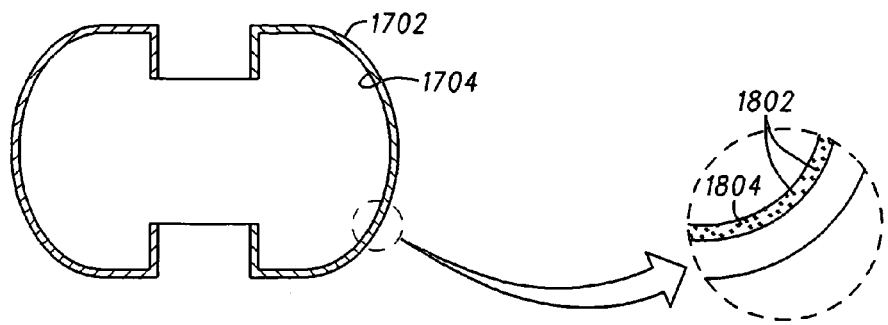
Fig. 17
Fig. 18
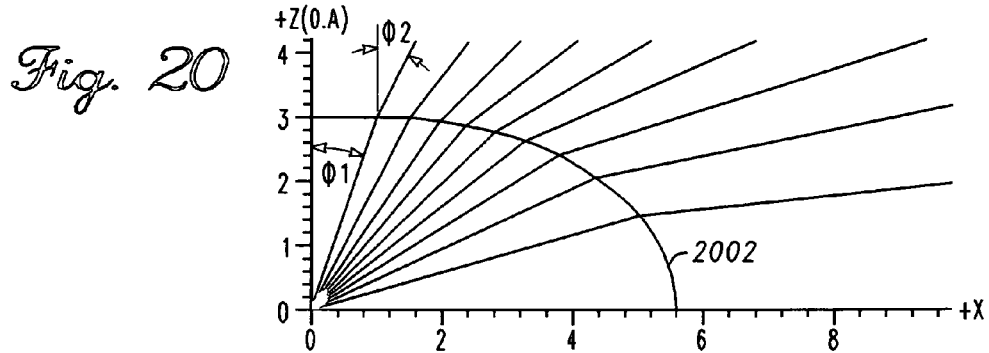
Fig. 20
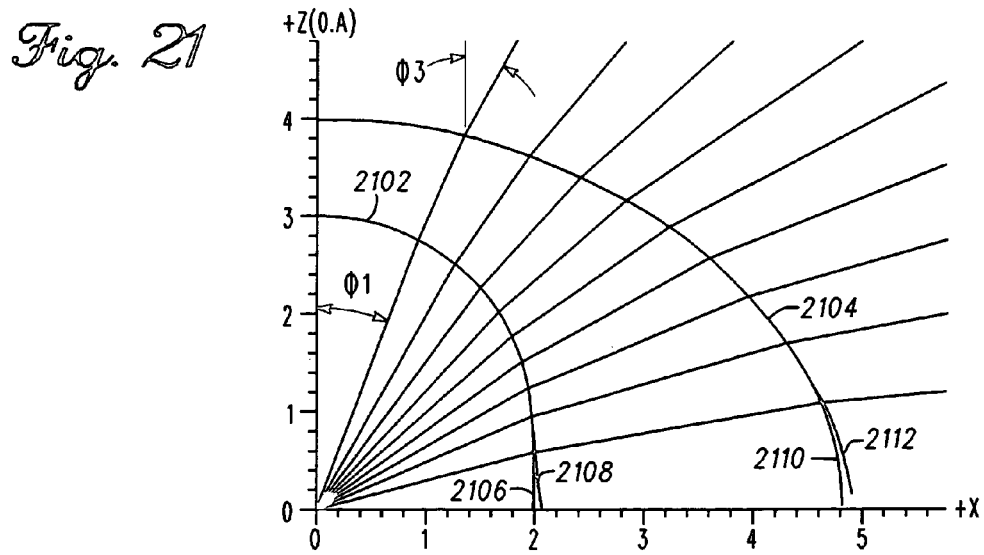
Fig. 21

OMNIDIRECTIONAL LED LIGHT BULB

CROSS-REFERENCE TO RELATED APPLICATIONS

This application is a National Stage Application of PCT International Application No. PCT/US2009000244 filed Jan. 15, 2009 which is based on U.S. Provisional Patent Application 61/011,180 filed Jan. 15, 2008.

FIELD OF THE INVENTION

The present invention relates to general illumination with Light Emitting Diodes.

BACKGROUND OF THE INVENTION

Traditionally Light Emitting Diodes (LEDs) have primarily been used as indicator lamps in electronic equipment. However recently the power and efficacy (e.g., lumens per watt of electrical power) has been increasing and LEDs have been identified as a possible replacement for inefficient incandescent bulbs.

Like incandescent light bulbs, LEDs generate a certain amount of heat. Whereas incandescent light bulbs radiate a large amount of heat as infrared radiation in the case of LEDs heat must mainly be dissipated by conduction and convection. It is important to prevent the temperature of LEDs from rising too much because as the temperature of the LED increases its light output, efficacy and lifetime decrease. Thus, the promised benefits of LED lighting in terms of efficacy and lifetime can be diminished. A single power LED produces several tens of lumens, so in order to match the light output of an incandescent light bulb ten or more LEDs would typically be required. More LEDs mean a greater heat load.

FIG. 1 shows a prior art LED light bulb 100. A set of four rectangular circuit boards 102 (two of which are visible) are arranged in a box formation. A smaller square circuit board 104 is arranged to close a top end of the box formation. LEDs 106 are mounted on the circuit boards 102, 104. The arrangement of circuit boards 102, 104 is enclosed in a space formed between a bulb shaped cover 108 and a lower plastic housing 110.

From a thermal standpoint, this arrangement tends to trap heat within the enclosed space leading to a relatively limited power handling capacity of such bulbs. At such low powers as can be used with this design, the light produced is inadequate to match a conventional incandescent lamp or a compact fluorescent lamp.

From an optical point of view, the light distribution is best described as ad hoc. The LEDs used may be Lambertian emitters or more directional than that so that the LEDs on the rectangular circuit boards 102 provide illumination that is highly peaked along the direction perpendicular to the boards 102 surfaces and likewise the LEDs on the smaller square top board 104 provide illumination that is highly peak in the upward direction. Generally there is no expectation or realization of illumination patterns that blend together to provide anything approaching uniform illumination. Thus, optically this bulb inadequately matches the light distribution of standard incandescent bulbs.

BRIEF DESCRIPTION OF THE FIGURES

The present invention will be described by way of exemplary embodiments, but not limitations, illustrated in the accompanying drawings in which like references denote similar elements, and in which:

FIG. 12 is an exploded view of an LED bulb according to an alternative embodiment of the invention;

FIG. 13 shows a partial sectional view of the bulb shown in FIG. 12;

FIG. 14 is a partially exploded view of an LED light bulb according to an alternative embodiment of the invention;

FIG. 17 shows a bulb shape cover that includes phosphor particles according to an embodiment of the invention;

FIG. 18 is a magnified view of a portion of the bulb shaped cover shown in FIG. 18;

FIG. 20 is a plot of a generatrix of a surface of a primary lens for use in an omnidirectional LED light bulbs according to an embodiment of the invention;

FIG. 21 is a graph including plots of generatrices of surfaces of a secondary lens that can be used to obtain more uniform illumination from white LEDs that are approximately Lambertian emitters;

DETAILED DESCRIPTION

Figure 2:
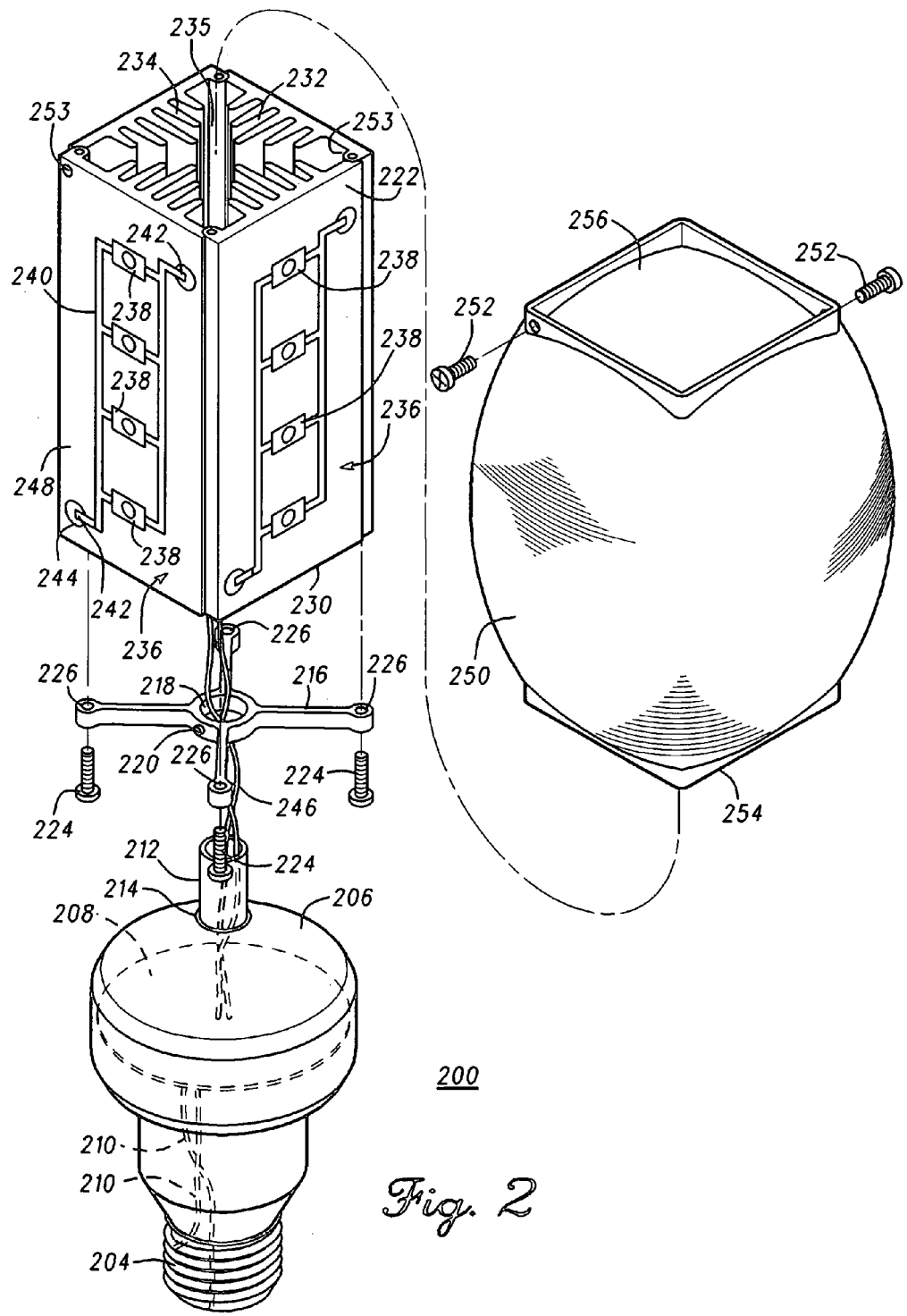
FIG. 2 is an exploded view of an LED light bulb according to an embodiment of the invention.

FIG. 2 is an exploded view of an LED light bulb 200 according to an embodiment of the invention. Referring to FIG. 2 a lower assembly 202 includes an Edison type base 204 coupled to a housing 206. (Alternatively, a terminal base other than Edison style is used.) A printed circuit board 208 is located is located in the housing 206. Alternatively more than one smaller circuit board is used. The printed circuit board 208 is connected to the Edison style base 204 by a pair wires 210. The printed circuit board 208 includes a circuit for adapting power received through the Edison style base 204 for driving LEDs. The circuit suitably comprise a switch mode buck power supply for converting relatively high household AC voltage to a lower DC voltage. Alternatively, in the case that LEDs that operate on household AC power are used, it is possible to eliminate the circuit board 208. The lower assembly is shown in partial X-ray view so that the internal structure can be seen.

A vertically (in the perspective of FIG. 2) extending stem 212 is received in a cylindrical recess 214 at the top of the housing 206. The vertically extending stem 212 is coupled to and supports an "X" shaped brace 216. The vertically extending stem 212 fits into a central bore 218 of "X" shaped brace 216. The "X" shaped brace 216 can be made inexpensively from metal or plastic by extrusion. The "X" shaped brace 216 can be fastened to the vertically extending stem 212 with a screw 220 or other device or method.

The "X" shaped brace 216 is coupled to and supports an LED support/heat sink 222. A set of four screws 224 extend through holes 226 located at ends of the arms of the "X" shaped brace 216 and are screwed into holes (See FIG. 4) in the LED support/heat sink 222. The LED support/heat sink 222 is hollow and is open at a bottom end 230 and a top end 232. The LED support/heat sink 222 is suitably made out of an aluminum extrusion, although other materials, e.g., copper and other manufacturing methods, e.g., casting can be used. The LED support/heat sink 222 has heat sink fins 234 that extend inward into its hollow interior 235. The LED support/heat sink 222 has four external faces 236 (two of which are visible in FIG. 2). Several LEDs 238 are mounted on each face 236. Some of the heat sink fins 234 extend inward from behind each face, so that LEDs 238 mounted on each face are served by some of the heat sink fins 234. Printed Circuits 240 for supplying power to the LEDs are formed on each face 236. The printed circuits 240 lead to terminals 242 that extend into feed-throughs 244 located in holes in the faces 236. Electrical wires 246 extend from the printed circuit board 208 through the stem 212, through the hollow interior of the LED support/heat sink 222 to the terminals 242. The wires can be fanned out (spliced to multiple branches) within the LED support/heat sink 222 in order to serve LEDs 238 on each face 236. The wires can be terminated with terminals (not shown) that mate with the terminals 242 positioned in the feed-throughs 244. Alternatively, wires can be run through drill holes and terminated on solder pads on the faces 236. Connections between the faces can be made by wires, flexible printed circuits or soldered on terminals that bridge across corners. The printed circuits 240 can be formed on a thermally conductive, electrically insulating coating 248 which covers at least portions of the faces 236. The coating 248 can be a plasma spayed alumina, an alumina layer formed by anodizing, or ceramic filled epoxy, for example. Other types of coatings known in the art may also be used. The printed circuits can be formed by screen printing or stencil a conductive ink that includes metal particles and the firing. Alternatively, the printed circuits can be formed by laminating a copper foil which is then patterned in a subtractive process, e.g., photolithography. Optionally the LED support/heat sink 222 can be part of the circuit supplying electrical power to the LEDs 238 (e.g., a ground return). Embedded passives (e.g., resistors, capacitors, inductors) may also be formed using the conductive coating of the LED support/heat sink 222.

A bulb shaped cover 250 fits over the LED support/heat sink 222. The bulb shaped cover 250 can be secured to the LED support/heat sink 222 by screws 252 or by other devices or methods. The LED support/heat sink 222 has threaded holes 253 for receiving the screws 252. The bulb shaped cover 250 has an opening at its bottom 254 and an opening at its top 256, so that it does not block air flow through the opening at the bottom 230 and the opening at the top 232 of the LED support/heat sink 222. Note that the "X" shaped brace 216 also does not block air flow through the LED support/heat sink 222.

Figure 1:
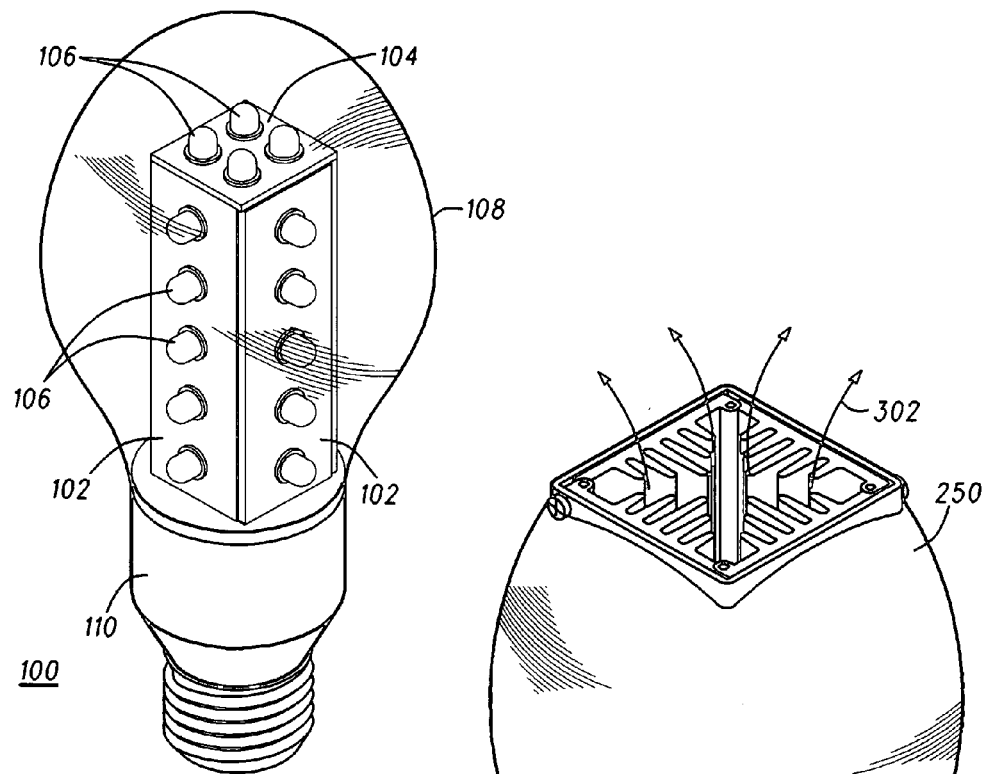
FIG. 1 shows a typical prior art LED light bulb.

In operation heat generated from the LEDs is conducted to the fins 234 and a convective flow of air flows axially through the hollow interior of the LED support/heat sink 222 passing over the fins and carrying away heat from the LEDs 238. (In the perspective of FIG. 2 the axial direction is vertical.) Although not shown in FIG. 1 alternatively forced convection may be used.

The bulb shaped cover 250 can be diffuse or clear and the external faces 236 of the LED support/heat sink 222 can be given a highly polished (specular) or diffuse (matte) finish. For low intensity vanity lights a highly polished finish of the faces 236 in combination with a clear bulb shaped cover 250 is appealing and in this case warm white LEDs or a mixture of colored LEDs or white LEDs with some color LEDs added for warmth may be used. The shape of the bulb shaped cover 250 may be varied for ornamental effect.

Although as shown in FIG. 2 the LED support/heat sink 222 has a square outside cross-sectional shape, alternatively the external cross-sectional shape is other than square, for example triangular, pentagonal, hexagonal or octagonal.

Figure 3:
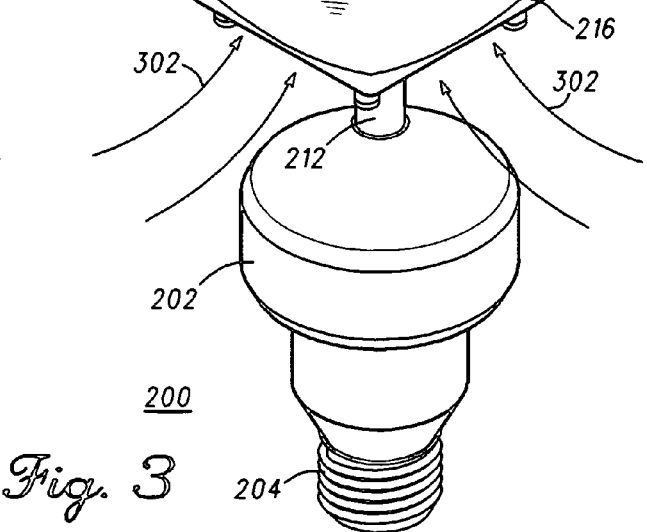
FIG. 3 is a view of the LED light bulb shown in FIG. 2 assembled.

FIG. 3 is a view of the LED light bulb 200 shown in FIG. 2 in an assembled state. In FIG. 3 arrows 302 represent convectively driven air flow flowing through the LED support/heat sink 222. When the bulb 200 is positioned upright as shown in FIGS. 2-3 the convectively driven air flow flows past the "X" shaped support 216 into the bottom end 230 of the LED support/heat sink 222, along the heat sink fins 234, and out the top end 232 of the LED support/heat sink 222. As the air flows past the heat sink fins 234 it removes heat produced by the LEDs 238. The heat sink fins 234 provide a large area for convective heat removal and the overall design provides this area without compromising the uniformity of the distribution of light produced by the bulb. Moreover, the design provides for continuous convectively driven air flow through the LED support/heat sink 222. If the bulb 200 is mounted inverted the direction of air flow will reverse. If the bulb is oriented horizontally in which case hot air may be expelled at the top of both ends and cool air admitted at bottom of both ends, but likely without producing a clean longitudinal flow pattern. However, any slight tilt from horizontal should produce a longitudinal flow. Experiments have shown that operation of a prototype in the horizontal position leads to a temperature increase for LEDs on the upward facing surface that is less than 10° C., the temperature for the LEDs on side facing sides and the downward facing side being lower.

Figure 4:
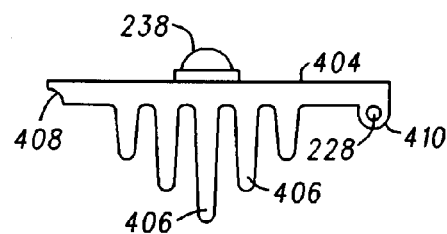
FIG. 4 is an end view of an extruded segment of an LED support/heat sink according to an embodiment of the invention.

FIG. 4 is an end view of an extruded segment 402 of an LED support/heat sink according to an embodiment of the invention. The segment 402 is designed to nest with identical segments to form a complete LED support/heat sink. Each segment 402 includes a face 404 on which LEDs 238 are mounted and which in an assembled LED support/heat sink will face outward and heat sink fins 406 which in an assembled LED support/heat sink will project inward as in the case of FIGS. 2-3. Nesting is achieved by having a concave end 408 and a complementary convex end 410, however one skilled in the art of extrusion will appreciate that many alternative nesting, snap-fit, slip-fit or interlocking geometries are possible. The screw holes 228 are provided in the convex end 410. The "X"-shaped brace 216 and the bulb shaped cover 250 will help to hold the interlocking segments 402 together. Although not shown in FIG. 1, in the case of a LED support/heat sink made of multiple segments, optionally another brace can be used at the top end. On the other hand the bulb shaped cover 250 may be relied on to provide mechanical support at the top end of a multi segment LED support/heat sink.

Making the LED support/heat sink out of multiple segments allows all the LEDs 238 to be soldered in a reflow soldering operation while the faces 404 are facing up. In the case that the LED support/heat sink is not made of multiple segments the LEDs can be held in place by a fixture while the solder is brought up to melting temperature, or solders having successively lower melting temperatures can be used to solder LEDs on successive faces 236, or a process that uses localized heating may be used. If localized heating (e.g., hot bar soldering) is used one way to attach packaged LEDs to the LED support/heat sink 222 would be to equip a pick and place machine with a computer operated rotary indexer which would sequentially present faces of the LED support/heat sink to robotic arms of the pick and place machine.

Figure 5:
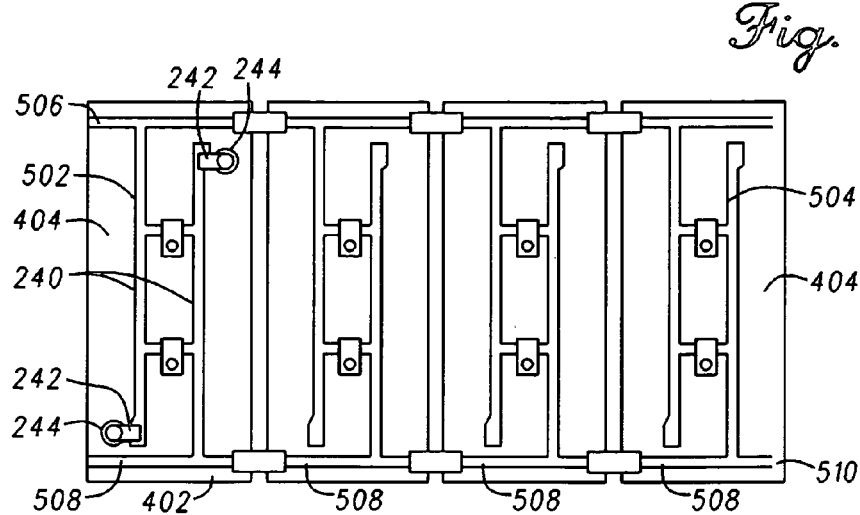
FIG. 5 shows four segments of an LED support/heat sink that is made up of multiple segments.

FIG. 5 shows four of the segments 402 after printed circuits 240 have been formed on the faces 404, and two LEDs 238 have been mounted on the faces 404 and soldered (or affixed with conductive adhesive) to the printed circuits 240. The printed circuits 240 on each face 404 include an anode connection printed circuit 502 and a cathode connection printed circuit 504. The cathode printed circuit 504 has a cathode bus line segment 506 extending horizontally (in the perspective of FIG. 4) proximate the top end of the face 404 and similarly the anode printed circuit 502 has an anode bus line segment 508 extending horizontally proximate the bottom end of the face 404. The bus line segments 506, 508 of the different segments 402 are connected by soldered bendable strips 510, which can for example be made from copper or brass or other conductive material. In lieu of the bendable strips wires with flat terminals or segments of flex circuit may be used. The left most segment 402 in FIG. 4 is provided with the contact terminals 242 which are positioned in the insulated feed throughs 244 and make contact with the printed circuits 502, 504 for supplying power thereto. It is unnecessary to drill (or otherwise form) holes for the insulted feed throughs 244 in the remaining segments 402. A set of four (or more) segments with LEDs 238, bendable strips 510 and contact terminals 242 in position as shown in FIG. 5 can be put through a solder reflow oven held in a jig in order to make a complete assembly which when complete can be folded up to make an LED support/heat sink.

In FIG. 5 all of the LEDs 238 are connected in parallel. Alternatively, the LEDs 238 are connected in series or, as a further alternative in a series-parallel network. One possible form of series-parallel network would have all of the LEDs 238 on each individual face 404 in series and have the circuits of the multiple faces 404 connected in parallel. Having all the LEDs 238 connected in series leaves the light bulb 200 vulnerable to complete failure if an open circuit defect develops anywhere in the LED circuit, but on the other hand reduces the current output requirement for the LED driver circuit on the printed circuit board 208. A series-parallel network is thus a good compromise between robustness to single-point failure and reducing current requirement for the LED driver circuit and parts of the power distribution network. A series-parallel arrangement may also be preferred in order to match the output impedance of a driver circuit.

Other possibilities for the fins of the LED support/heat sink include cross-cut extruded fins, pin fins, folded fins, stacked fins, skeaved fins and a new fin construction that comprises an assembly of stacked stamped plates in which at least some of the stamped plates include fin profiles. Some of these are described below and shown in the FIGs.

Figure 6:
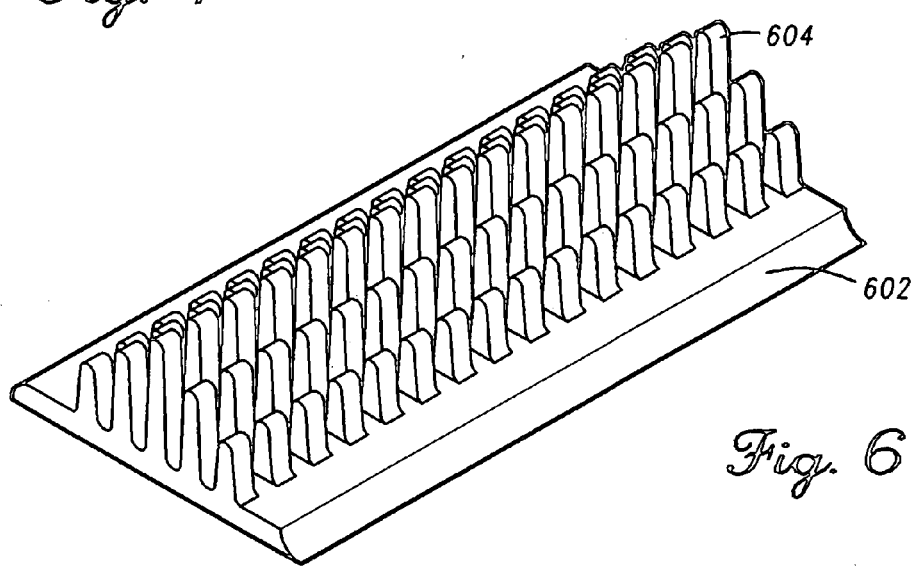
FIG. 6 shows an LED support/heat sink segment with cross-cut extruded fins according to an embodiment of the invention.

FIG. 6 includes one segment 602 of an extruded LED support/heat sink that has cross cut fins 604.

Figure 7:
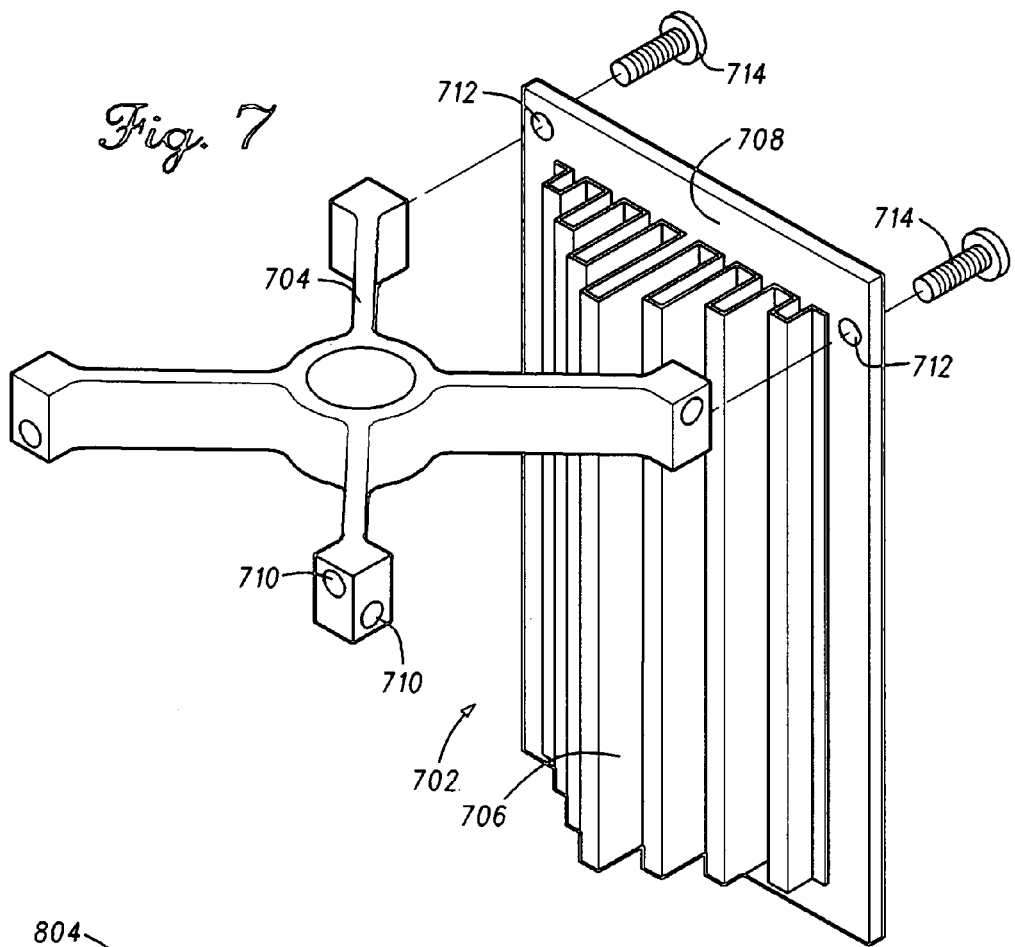
FIG. 7 shows an LED support/heat sink segment with a folded fin and an associated X-shaped brace according to an embodiment of the invention.

FIG. 7 shows one segment of an LED support/heat sink 702 along with an associated X-shaped brace 704. The complete LED support/heat sink would have four such segments, however alternatively it could have a different number of segments in which case the X-shaped brace 704 would be modified to have a different number of radial arms. This LED supported/heat sink, which can be made from copper or aluminum for example, includes a folded fin 706 thermally connected to a base plate 708. The folded fin 706 can be thermally connected to the base plate 708 by brazing, soldering, by thermal grease or a thermally conductive adhesive, for example. The folded fin 706 is shaped as a square wave with a triangular envelope. The folded fin 706 can be made by roll forming. Copper has a higher thermal conductivity than aluminum and the folded fin design provides one way to make the LED support/heat sink from copper. The X-shaped brace 704 includes a number of threaded drilled holes 710 that align with holes 710 in the base plate 708 and screws 714 are used to secure the two together. Rather than having square corners at the tips of the fins a radiused form could be used.

Figure 8:
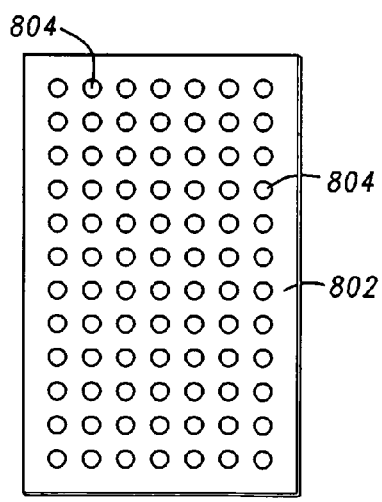
FIG. 8 shows an LED support/heat sink with pin fins according to an embodiment of the invention.

FIG. 8 is a plan view of one segment 802 of an LED support/heat sink that includes an array of pin fins 804 (two of which are identified by reference numeral to avoid crowding the FIG.)

Figure 9:
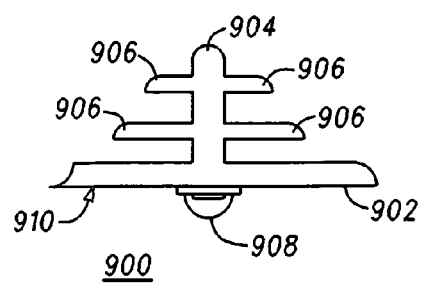
FIG. 9 shows an end view LED support/heat sink segment with a branched heat sink fin according to an embodiment of the invention.

FIG. 9 shows an end view of an LED support/heat sink segment 900 with a branched heat sink fin according to an embodiment of the invention. The branched heat sink fin comprises a main fin 904 extending from a base 902 and a plurality of branch fins 906 extending from the main fin 904. One or more LEDs 908 (one of which is visible in FIG. 9) are mounted on an outside surface 910 of the segment 900 proximate the juncture of the base 902 and the main fin 904. Although not shown in FIG. 9 all or parts of the branched heat sink fit can be cross cut.

Figure 10:
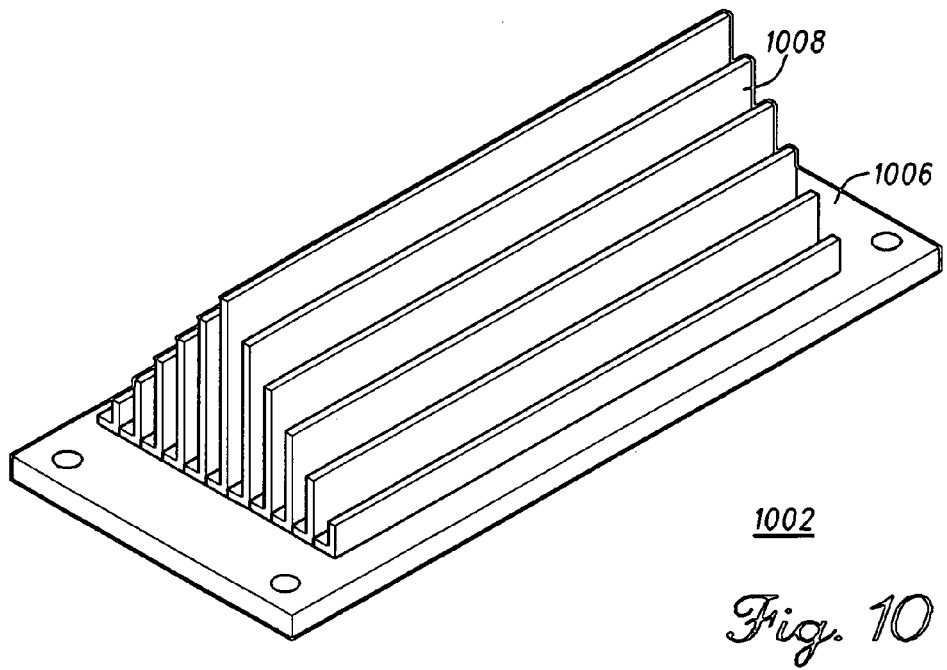
FIG. 10 shows an LED support/heat sink segment with stacked fins according to an embodiment of the invention.

FIG. 10 includes one segment 1002 of an LED support/heat sink. This segment includes a set of stacked fins 1008 that are attached to a base plate 1006. The fins 1008 have different height and are arranged in order to produce the triangular envelope profile shown in FIG. 10. The fins may be attached by brazing, soldering or using thermally conductive adhesive, for example.

Figure 11:
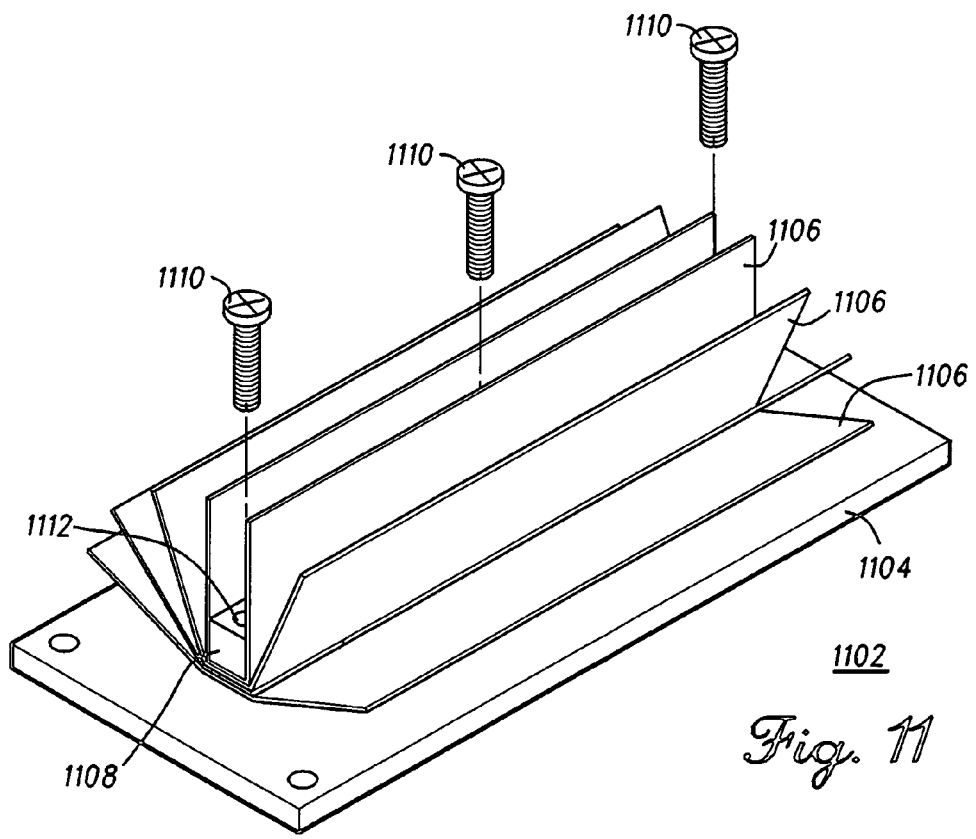
FIG. 11 shows an LED support/heat sink segment that includes a stack of fins bent at different angles according to an embodiment of the invention.

FIG. 11 shows a LED support/heat sink segment 1102 according to an alternative embodiment. The segment 1102 includes a base 1104 to which a plurality of heat sink fins 1106 are clamped using narrow elongated clamping plate 1108 and screws 1110. The heat sink fins 1106 are sheets of heat conductive material such as copper or aluminum, which are clamped along their centerlines and bent away from the base 1104. Each heat sink fin 1106 is bent at a different angle as shown. The clamping plate 1108 includes holes 1112 for the screws 1110 and the fins 1106 include corresponding holes which are not visible in the figure. The base 1104 includes corresponding threaded holes, that are not visible, into which the screws 1110 thread. A region of the base 1104 under the clamping plate 1108, the underside of the clamping plate 1108 and the areas of the fins 1106 that are clamped are suitably coated with thermal adhesive or thermal grease. Alternatively, solder or brazing can be used. LEDs (not visible in FIG. 11) are suitably mounted on the front face (bottom face in FIG. 11) of the base overlying or proximate the clamping plate 1108. The clamping plate 1108 is suitably made of a thermally conductive material such as copper or aluminum so that it contributes to longitudinal conduction of heat away from the LEDs.

FIG. 12 is an exploded view of an LED bulb 1200 showing some alternative features according to an embodiment of the invention and FIG. 13 is a partial sectional view of the bulb shown in FIG. 12. Starting from the bottom of FIG. 12, the bulb includes an Edison style base 1202 attached to a lower housing 1204. The lower housing 1204 includes a D-shaped recess 1206 for receiving a D-shaped stem 1208. According to alternative embodiments a stem and lower housing are made in one piece. The stem 1208 fits into a D-shaped central hole 1210 of an X-shaped brace 1212. According to alternative embodiments a stem and an X-shaped brace are made in one piece. Four U-shaped screw bosses 1214 are located at ends of four arms of the X-shaped brace 1212. The U-shape of the bosses 1214 is better adapted for extrusion than would be closed holes, allowing the X-shaped brace 1212 to be made inexpensively. A set screw 1211 helps secure the X-shaped brace 1212 to the stem 1208. Four LED support/heat sink segments 1216 interlink together to form a square LED support/heat sink. Each segment 1216 has a male interlinking portion 1218 on one side and a complementary female interlinking portion 1220 on an opposite side. The male portion 1218 has a semi-circular x-section outside surface and the female interlinking portion 1220 has a semi-circular x-section inside surface. A portion of the male portion 1218 at both the top and bottom ends of the segments 1216 is trimmed away to leave an empty space in the female interlinking portion 1220. These spaces will serve as screw bosses for receiving a lower set of screws 1222 and an upper set of screws 1224 (e.g., self-tapping screws). A square upper brace 1226 includes internal corner cut-out portions 1228 for the upper set of screws 1224 to pass through. A lower bulb-shaped cover 1230 and an upper bulb-shaped cover 1232 fit together at half-lap edges 1234 forming a complete bulb shaped cover. Alternatively one or both of the bulb shaped covers 1230, 1232 can be made with a radially undulating edge so that contact between the two is only made at points thereby allowing for the passage of convectively driven air through radial gaps between the points. When assembled the upper set of screws 1224 pass through a set of holes 1236 in the upper bulb-shaped cover 1232 through a set of spacers 1238 through the cut-out portions 1228 and into the female interlinking portions 1220 of the segments 1216. The lower set of screws 1222 pass through holes (not shown) in the lower bulb-shaped cover 1230, through the U-shaped screw bosses 1214 of the X-shaped brace 1212 and through a set of spacers 1240 and into the female interlinking portions 1220 of the LED support/heat sink segments 1216.

As shown in FIGS. 12 and 13 two LEDs 1242 are mounted on each LED support/heat sink segment 1216 for a total of eight LEDs. The eight LEDs can be operated at 10 watts at an acceptably low temperature while providing an adequate amount of light for replacing a conventional incandescent bulb. As LED efficacy improves greater light output will be possible. Alternatively only one LED is used on each segment 1216.

As shown each LED 1242 comprises an LED chip mounted on a large substrate 1244 and surrounded by a large primary lens 1246. The primary lens and an alternative secondary lens are described below. The lenses serve to distribute light from the LED chips more evenly that the quasi-Lambertian distribution produced by an LED chip with an ordinary hemispherical primary lens. Because the lenses can redistribute the light substantially as needed, the design of the LED support/heat sink can be optimized for heat dissipation, there being no need to place LEDs in a top position where they would interfere with the free convective flow afforded by the open LED support/heat sink design.

As shown in FIG. 13 convectively driven air flow indicated by streamline 1302 can flow past the X-shaped brace 1212 into the space between the support/heat sink segments 1216 and the bulb shaped covers 1230, 1232, between the spacers 1238 and out of the bulb 1200, thus allowing the external faces of the segments 1216 to contribute to heat dissipation. At the same time, as indicated by light rays shown in FIG. 13, the bulb shaped covers 1230, 1232 fully surround the LEDs optically, so that all light from the LEDs will be diffused in the case that the diffusive bulb shaped covers 1230, 1232 are used.

FIG. 14 shows an LED light bulb 1400 according to an alternative embodiment of the invention. In this embodiment a circuit board 1402 that includes at least part of the LED driver circuit is positioned within (along the diagonal) of an LED support/heat sink 1404. In this case a smaller housing 1406 is used. The volume enclosed by the Edison style base 204 and the smaller housing 1406 can still be used to enclose some circuit components, for example a bulky magnetic components such as inductors or transformers.

Figure 15:
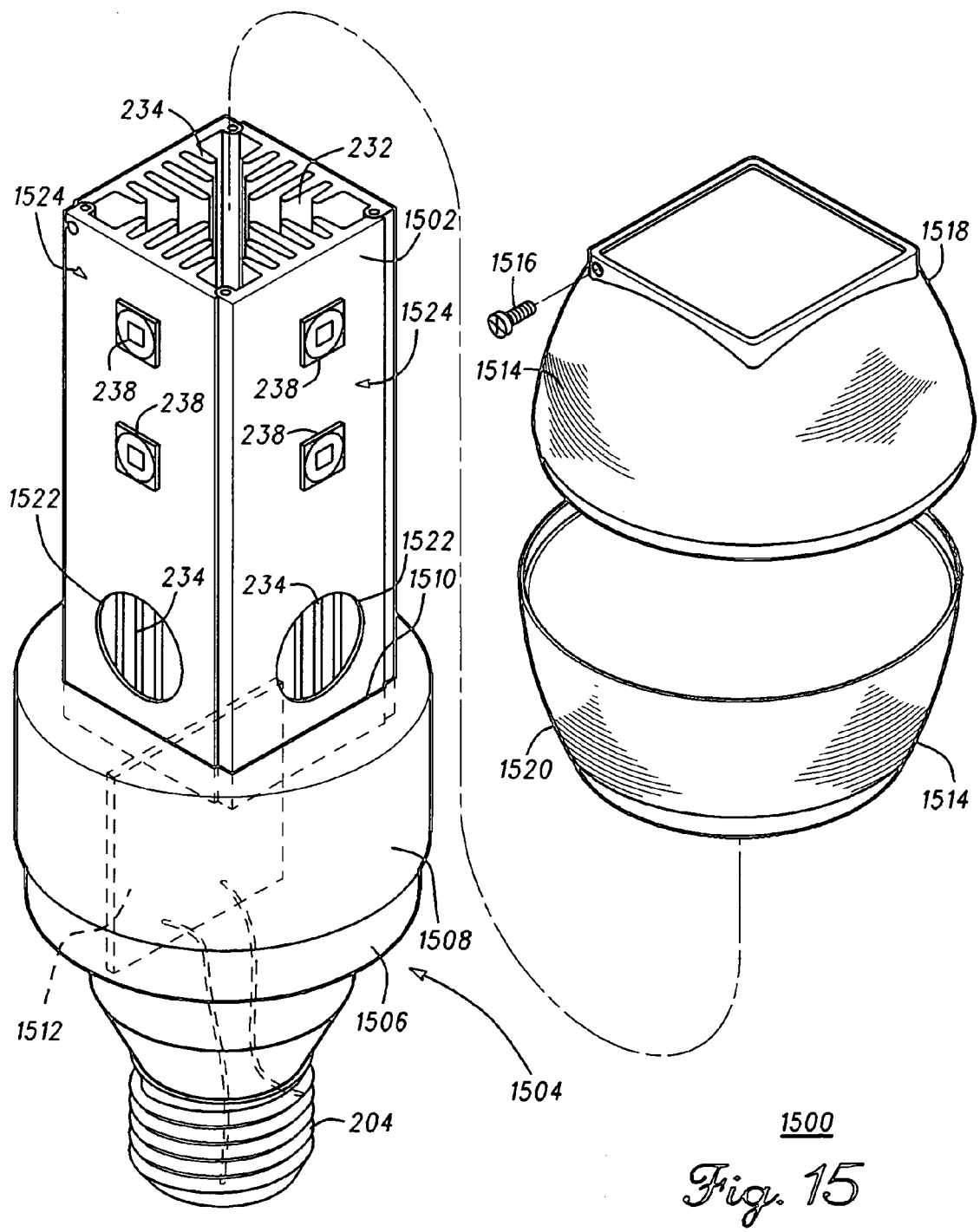
FIG. 15 is a partial X-ray view of an LED light bulb according to a further embodiment of the invention.

FIG. 15 shows an LED light bulb 1500 according to a further alternative embodiment of the invention. In this case the stem 212 and the "X" shaped brace 216 are not utilized. Instead, an LED support/heat sink 1502 with internal heat sink fins 234 extends directly from a lower assembly 1504. The lower assembly 1504 includes an Edison style base 204 attached to a lower housing part 1506 which attaches to an upper housing part 1508. The LED support/heat sink 1502 fits into a complementary shaped (e.g., square, pentagonal) opening 1510 in the upper housing part 1508. The lower housing part 1506 and the upper housing part 1508 enclose a circuit board 1512 that includes an LED driver circuit. The housing parts 1506, 1508 can be made inexpensively by injection molding plastic. A two-piece bulb shaped cover 1514 fits over the LED support/heat sink 1502 and is secured thereto by one or more screws 1516 or by other fastening devices or methods. The bulb shaped cover 1514 includes an upper half 1518 and a lower half 1520 joined at the equator, e.g., by snap fitting as known in the art of plastic design. Except, perhaps for ornamental bulbs, the bulb shaped cover 1514 has a rounded shape. The bulb shaped cover 1514 can also be made inexpensively by injection molding plastic. Alternatively the bulb shaped cover can be made by blow molding followed by trimming (e.g., machining) to form top and bottom openings. The bulb shape cover can also be made of glass although at greater expense.

In order to provide convectively driven longitudinal air flow through the LED support/heat sink 1502 side openings 1522 are formed on the faces 1524 of the LED support/heat sink 1502 proximate the upper housing part 1508 of the lower assembly 1504. Heated air, carrying heat transferred from the LEDs 238 through the fins 234 will rise out of the top end 232 of the LED support/heat sink 1502 and cool air will be drawn into the openings 1522. If the bulb 1500 is inverted the flow direction will reverse. The openings 1522 can be formed by spot facing with an end mill in an automated machining center. Although the openings 1522 as shown are circular, alternatively other shapes can be used, for example slots, or squares with rounded corners. These shapes can also be machined with an end mill. By eliminating the stem 212 and the "X" shaped brace 216 the part count of the bulb 1500 is reduced.

Figure 16:
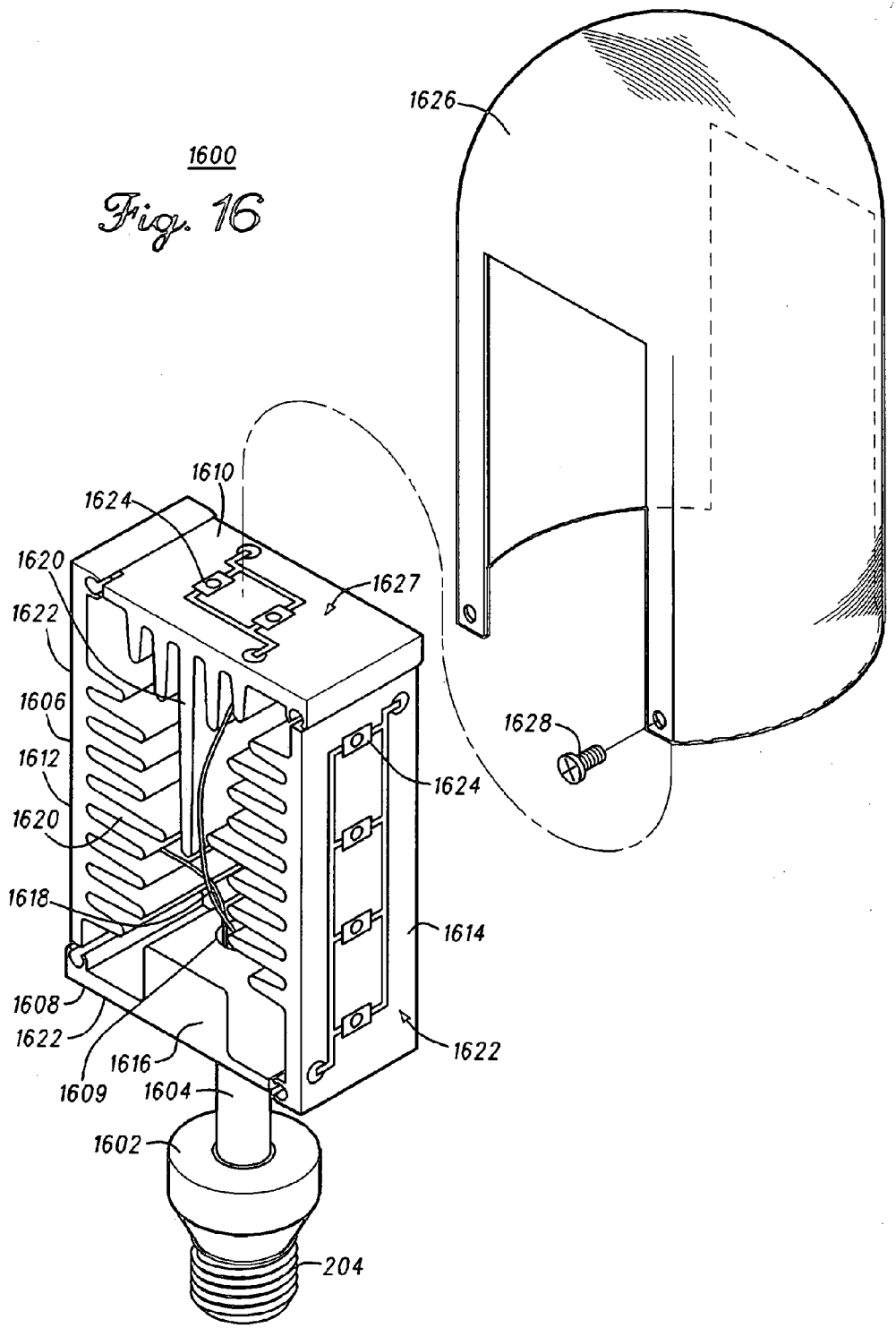
FIG. 16 is perspective view of an LED light bulb according to a still further embodiment of the invention.

FIG. 16 is perspective view of an LED light bulb 1600 according to a still further embodiment of the invention. The LED light bulb 1600 comprises a lower housing 1602 including an Edison base 204. The lower housing 1602 is connected via a hollow stem 1604 to a hollow LED support/heat sink 1606. The LED support/heat sink 1606 is made up extruded (e.g., aluminum) segments 1608, 1610, 1612 and 1614. In this case the extrusion direction is perpendicular to the longitudinal axis of the LED light bulb 1600. (The longitudinal axis is parallel to the hollow stem 1604.) The segments 1608, 1610, 1612 and 1614 include a lower segment 1608 and upper segment 1610, a left segment 1612 and a right segment 1614. The left segment 1612 and the right segment 1614 can be the same extrusion. The lower segment 1608 has a hole 1609 drilled (or otherwise formed) in a boss 1616 to receive the top end of the hollow stem 1604. The hole 1609 can be stepped down at the end so the stem 1604 will be prevented from passing completely through, while at the same time allowing power supply wires 1618 to pass through. The segments 1608, 1610, 1612 and 1614 come together at interlocking corner joints. The upper segment 1610, the left segment 1612 and the right segment 1614 include heat sink fins 1620 that extend inward into a space formed in the middle of the joined segments 1608, 1610, 1612 and 1614. Optionally the lower segment 1608 also includes inwardly extending heat sink fins. The segments 1608, 1610, 1612 and 1614 include external faces 1622. LEDs 1624 (only two of which are numbered to avoid crowding the drawing) are mounted on one or more of the external faces 1622. According to one embodiment the LEDs 1624 are mounted on the faces 1622 of the side segments 1612, 1614 and upper segment 1610. Optionally LEDs 1624 can also be mounted on the lower segment 1608. If a secondary optic (not shown) that makes the light output from the LEDs 1624 more uniform than the bare Lambertian distribution is used, then a sufficiently uniform overall light distribution may be obtained from LEDs 1624 mounted only on the side segments 1612, 1614. In such a case the heat sink fins 1620 of the upper segment 1610 can be reduced in size or eliminated in order to allow the heat sink fins 1620 of the side segments 1612 1614 to be increased in size, thereby affording increased cooling for the LEDs 1624. A light transmissive cover 1626 that has the shape of a "U" shaped cross section extruded along a "U" shaped path fits over the LED support/heat sink 1606. The cover 1626 is secured with a set of screws 1628 (or other fastening device or method.) The cover 1626 allows free access to the heat sink fins 1620 allowing convective heat transfer to take place.

In white LEDs that include a phosphor in close proximity to the LED chip, some phosphor converted light may be back-scattered to the LED light and absorbed thereby reducing the LEDs efficacy.

FIGS. 17, 18 show a bulb shaped cover 1702 according to an alternative embodiment of the invention. According to the alternative embodiment of the invention rather than using LEDs that incorporate the phosphor; excitation (e.g., blue or UV) LEDs are used in combination with the bulb shaped 1702 cover shown in FIGS. 17-18 which includes a coating 1704 that includes phosphor particles 1802 (only two of which are numbered to avoid crowding the drawing) dispersed in a transparent binder 1804. Alternatively the phosphor particles are dispersed in the bulk of the material of the bulb shaped cover 1802.

Figure 19:
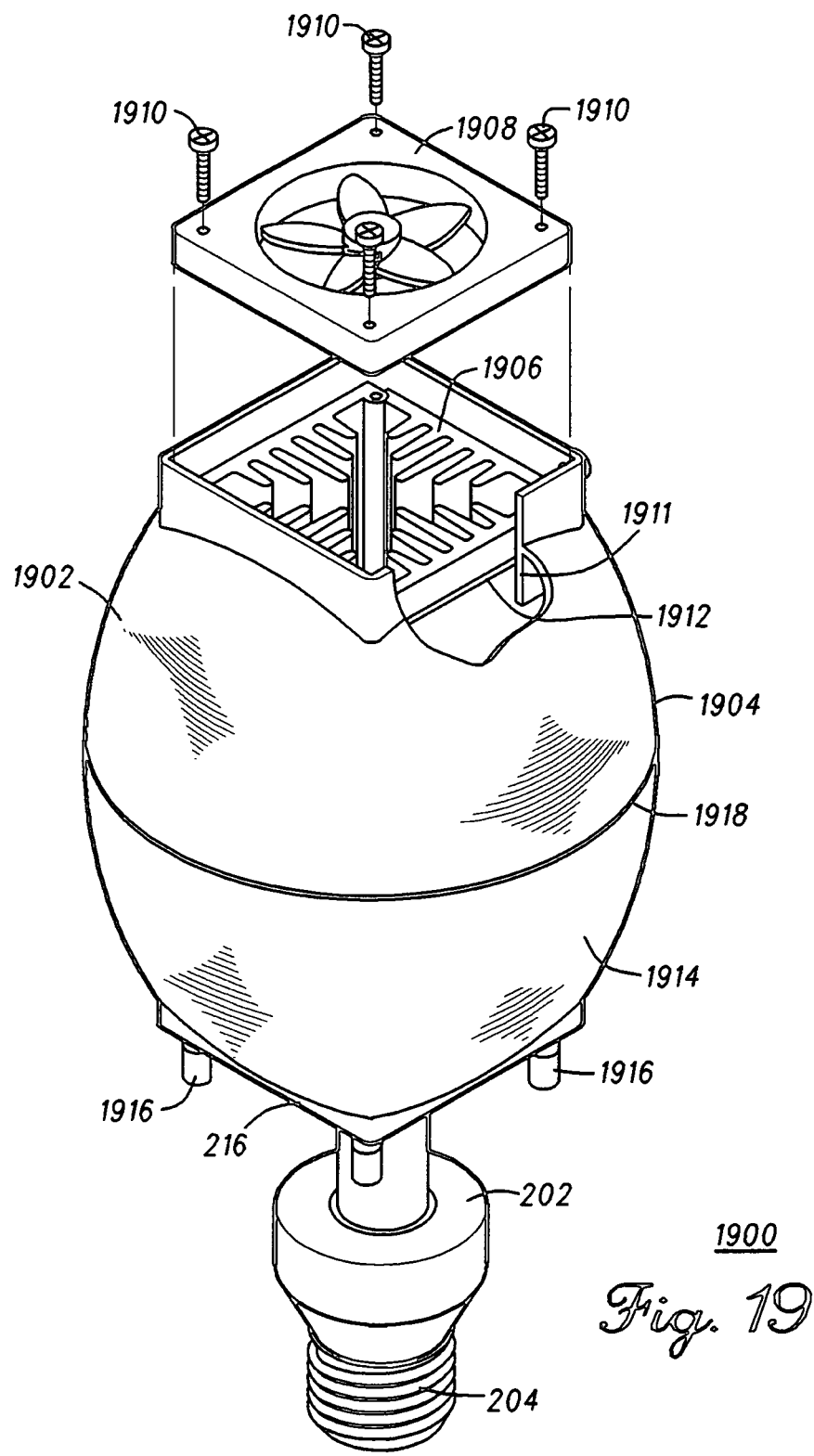
FIG. 19 shows an omnidirectional LED bulb that includes a fan (or alternatively another active air moving device) for forced convection cooling according to an embodiment of the invention.

According to certain embodiments, e.g., higher power smaller bulbs, passive cooling may be insufficient, however the designs described above lend themselves to active cooling. FIG. 19 shows an omnidirectional light bulb 1900 that includes active cooling. The bulb 1900 includes a bulb shaped cover 1902 that includes an upper part 1904 that extends above an LED support/heat sink 1906. The extending portion of the upper part accommodates a cooling fan 1908 (shown detached in FIG. 19 for clarity). The cooling fan 1908 is suitably supplied by wires (not shown) that extend up through the LED support/heat sink 1906. The cooling fan 1908 can be driven based on a reading of a temperature sensor (not shown). Four screws 1910 are provided for securing the cooling fan 1908 to the LED support/heat sink 1906. Alternatively, in lieu of a cooling fan, a corona discharge air pump is used. Such devices are sometimes called "corona wind" or "ion wind" devices.

A portion of the upper part 1904 of the bulb shaped cover 1902 is shown broken away to reveal an inner depending skirt 1911 that extends downward in overlapping relation to the LED support/heat sink 1906. A seal 1912 is provided between the depending skirt 1911 and the LED support/heat sink 1906. A similar seal (not shown) would be provided at the bottom of the Led support/heat sink forming a sealed space. The seal 1912 may take the form of a gasket, or sealing compound for example. A lower part 1914 of the bulb shaped cover 1902 includes two tipoffs 1916 which are used to flush air out of the interior of the bulb shaped cover and fill the interior with a dry inert gas (e.g., nitrogen, rare gas). Doing so will avoid condensation in the vicinity of the LEDs and control oxidative degradation of the LEDs or circuitry supplying the LEDs. The tipoffs 1916 can be sealed by crimping with a heated tool or using another device or method. A joint 1918 between the upper part 1904 and lower part 1914 of the bulb shaped cover 1902 is suitably sealed with a sealant, e.g., silicone or using another device or method.

In the embodiments shown above the LEDs 238 are directly attached to the LED support/heat sink 222, 602, 900, 1002. Alternatively, especially for initial production, the LEDs can be mounted on a small printed circuit board which is in turn attached to the LED support heat sink 222, 602, 900, 1002, e.g., with screws, however doing so introduces additional thermal resistance.

For omnidirectional LED light bulbs it is appropriate to provide a relatively uniform distribution of light. FIG. 20 shows a generatrix 2002 of an outer lens surface of a primary lens for an LED that is designed to provide a more uniform distribution of light than the typical hemispherical primary lens or other primary lenses such as the side-emitting primary lens or the "batwing" primary lens. The axes in FIG. 20 and FIG. 21 are millimeters. The lens represented in FIG. 20 is taught in my issued U.S. Pat. No. 8,339,716 entitled "Illumination Lenses Including Light Redistributing Surfaces". The lenses 1246 used in the embodiment shown in FIG. 12 and in other embodiments can be of this design. The lens surface is obtained by revolving the generatrix about the Z-axis shown in FIG. 20. The lens is described by the following differential equation:

$$\frac{\partial}{\partial \phi 1} r1 = \frac{r1 n2 \sin(\phi 2 - \phi 1)}{-n2\cos(\phi 2 - \phi 1) + n1} \qquad \text{DE 1}$$

Where,
r1 is a radial coordinate of the lens surface;
phi1 is a polar (zenith) angle coordinate of the lens surface, and is also the domain (independent) variable over which the above equation is defined (see FIG. 20);
n1 is the index of refraction of the lens defined by the equation;
n2 is the index of refraction of the surrounding medium (e.g., of air) which usually equals 1 and
phi2 is the polar angle variable for a predetermined specified output light intensity and is equal to the polar angle of an ideal ray (a ray emitted at the origin of the X-Z coordinate system shown in FIG. 20) that was initially emitted at angle phi1 after the ray has left the surface of each lens defined by the equation (see FIG. 20) and is given by:

$$\frac{\int_{\phi1\_MIN}^{\phi1} \text{rad\_in}(\phi1) \cdot 2\pi \cdot \sin(\phi1) d\phi1}{\int_{\phi1\_MIN}^{\phi1\_MAX} \text{rad\_in}(\phi1) \cdot 2\pi \cdot \sin(\phi1) d\phi1} =$$

$$\frac{\int_{\phi2\_MIN}^{\phi2} \text{rad\_out}(\phi2) \cdot 2\pi \cdot \sin(\phi2) d\phi2}{\int_{\phi2\_MIN}^{\phi2\_MAX} \text{rad\_out}(\phi2) \cdot 2\pi \cdot \sin(\phi2) d\phi2}$$

EQU. 1 where,
phi1_MIN and phi1_MAX are the lower and upper polar angle limits respectively of light collected by each lens defined by DE1;
phi2_MIN and phi2_MAX are the lower and upper polar angle limits respectively of a predetermined specified output light intensity distribution for each lens defined by the DE1;
rad_in(phi1) is the light intensity distribution (e.g., quasi-Lambertian) of the LED for which the lens is designed; and
rad_out(phi2) is the predetermined specified output light intensity distribution for each lens defined by the equations; with initial conditions r1_ini for r1.
DE1 is integrated numerically and EQU. 1 is solved numerically for each input value of phi1, as needed, during the integration.

Table 1 below includes the parameters and light distribution functions corresponding to FIG. 20.

TABLE I

| | |
|---|---|
| Phi1_MIN | 0.0 radians |
| Phi1_MAX | 1.57 radians (90 degrees) |
| Phi2_MIN | 0.0 radians |
| Phi2_MAX | 1.57 radians (90 degrees) |
| rad_in(phi1) | Quasi Lambertian measured data |
| rad_out(phi2) | =1.0 (Uniform Intensity Goal) |
| r1_ini | 3.0 |
| n1 | 1.4 |
| n2 | 1.0 |

Note that rad_in(phi1) was based on measurements of an LED with a hemispherical primary lens and is approximately equal to the ideal Lambertian distribution which is cos(phi1).

The shape of the lens surface transforming a Lambertian distribution to a uniform distribution given by DE1 (half of which is shown in FIG. 20) can be broadly described as half of an oval.

The lens has a calculated transmittance of 96.7% with only small Fresnel losses at the single surface. Some of the light reflected by the single surface will be recovered by being scattered back out of the lens.

The lens is not expected to produce perfect uniformity due to the finite size of the LED chip and due to edge effects occurring at the limit of the angular range of the lens ($\phi=90°$). Any non-uniformities will be diminished by using a bulb shaped cover (e.g., 250) that is diffusive, because a diffusive bulb shaped cover acts as a low pass filter in the domain of $\phi2$ integrating deviations from the average intensity level.

Note that by arranging two LEDs with such lenses facing in opposite directions the full solid angle ($4\pi$ steradian) about the arrangement will be illuminated. Thus by providing LEDs on four sides of the LED support/heat sinks described above the full solid angle ($4\pi$ steradian) is covered redundantly.

The LEDs used in the bulbs described above can be white LEDs and/or color LEDs.

According to an alternative embodiment LEDs with common hemispherical primary lenses are used in combination with secondary lenses that redistribute the light emitted by the LEDs more uniformly than the bare LED. FIG. 21 a generatrix of an inner surface 2102 and a generatrix of an outer surface 2104 of such a secondary lens. The lens is described in issued U.S. Pat. No. 8,405,920 entitled "ILLUMINATION LENSES". The lenses surfaces are mainly described by a set of coupled differential equations DE2 and DE3, however a portion 2106 of the first surface defined by DE2 would curve inward leading to manufacturing difficulties and so is replaced with a constant draft (conical) portion 2108 and to compensate for this alteration in the first surface a portion of the second surface 2110 is replaced with a portion 2112 redefined by DE4 given below. The equations are:

$$\frac{\partial}{\partial \phi1} r1(\phi1) = \frac{r1 n2 \sin\left(\frac{1}{2}\phi1 - \frac{1}{2}\phi3\right)}{n2\cos\left(\frac{1}{2}\phi1 - \frac{1}{2}\phi3\right) - n1}$$

DE 2

$$\frac{\partial}{\partial \phi 1} r2 = r2(\phi 1)\tan\left(\%3 - \arcsin\left(\frac{r1(\phi 1)\sin(\%4)}{r2(\phi 1)}\right)\right) \qquad \text{DE 3}$$

$$\left(1 - \left(\frac{n1\cos(\%1)\ \%5}{(n2\cos(\%1)-n1)\sqrt{\%2}} + \frac{n1\sin(\%1)^2 n2\ \%5}{(n2\cos(\%1)-n1)^2\sqrt{\%2}} - \frac{1}{2}\frac{n1\sin(\%1)\left(2\frac{n2^2\sin(\%1)\cos(\%1)\ \%5}{(n2\cos(\%1)-n1)^2} + 2\frac{n2^3\sin(\%1)^3\ \%5}{(n2\cos(\%1)-n1)^3}\right)}{(n2\cos(\%1)-n1)\ \%2^{(\frac{3}{2})}}\right)\right/$$

$$\sqrt{1 - \frac{n1^2\sin(\%1)^2}{(n2\cos(\%1)-n1)^2\ \%2}} + \frac{\frac{n2\cos(\%1)\ \%5}{n2\cos(\%1)-n1} + \frac{n2^2\sin(\%1)^2\ \%5}{(n2\cos(\%1)-n1)^2}}{\%2} - \left(\frac{\left(\frac{\partial}{\partial \phi 1}r1(\phi 1)\right)\sin(\%4)}{r2(\phi 1)} + r1(\phi 1)\cos(\%4)\right)$$

$$\left(-\left(\frac{n1\cos(\%1)\ \%5}{(n2\cos(\%1)-n1)\sqrt{\%2}} + \frac{n1\sin(\%1)^2 n2\ \%5}{(n2\cos(\%1)-n1)^2\sqrt{\%2}} - \frac{1}{2}\frac{n1\sin(\%1)\left(2\frac{n2^2\sin(\%1)\cos(\%1)\ \%5}{(n2\cos(\%1)-n1)^2} + 2\frac{n2^3\sin(\%1)^3\ \%5}{(n2\cos(\%1)-n1)^3}\right)}{(n2\cos(\%1)-n1)\ \%2^{(\frac{3}{2})}}\right)\right/$$

$$\sqrt{1 - \frac{n1^2\sin(\%1)^2}{(n2\cos(\%1)-n1)^2\ \%2}} + \frac{\frac{n2\cos(\%1)\ \%5}{n2\cos(\%1)-n1} + \frac{n2^2\sin(\%1)^2\ \%5}{(n2\cos(\%1)-n1)^2}}{\%2}\Bigg)\Bigg/ r2(\phi 1)\Bigg/ \sqrt{1 - \frac{r1(\phi 1)^2\sin(\%4)^2}{r2(\phi 1)^2}}\Bigg/$$

$$\left(1 - \frac{\tan\left(\%3 - \arcsin\left(\frac{r1(\phi 1)\sin(\%4)}{r2(\phi 1)}\right)\right) r1(\phi 1)\sin(\%4)}{r2(\phi 1)\sqrt{1 - \frac{r1(\phi 1)^2\sin(\%4)^2}{r2(\phi 1)^2}}}\right)$$

$$\%1 := -\frac{1}{2}\phi 1 + \frac{1}{2}\phi 3(\phi 1)$$

$$\%2 := 1 + \frac{n2^2\sin(\%\ 1)^2}{(n2\cos(\%\ 1) - n1)^2}$$

$$\%3 := \arcsin\left(\frac{n1\sin(\%\ 1)}{(n2\cos(\%\ 1) - n1)\sqrt{\%\ 2}}\right)$$

$$\%4 := -\%\ 3 + \arctan\left(\frac{n2\sin(\%\ 1)}{n2\cos(\%\ 1) - n1}\right)$$

$$\%5 := -\frac{1}{2} + \frac{1}{2}\left(\frac{\partial}{\partial \phi 1}\phi 3(\phi 1)\right)$$

Where:

n2 is the index of refraction of the lens defined by the equations;

n1 is the index of refraction of the surrounding medium (e.g., of air) which usually equals 1;

phi1 is the polar angular coordinate (zenith angle) of the first lens surface; phi3 is the polar angle (zenith angle) of an ideal ray (a ray emitted at the origin) that was initially emitted at angle phi1 after the ray has left the second surface of each lens defined by the equations (see FIG. 21) and is given by:

$$\frac{\int_{\phi 1\_MIN}^{\phi 1} \text{rad\_in}(\phi 1) \cdot 2\pi \cdot \sin(\phi 1) d\phi 1}{\int_{\phi 1\_MIN}^{\phi 1\_MAX} \text{rad\_in}(\phi 1) \cdot 2\pi \cdot \sin(\phi 1) d\phi 1} = \qquad \text{EQU. 2}$$

$$\frac{\int_{\phi 3\_MIN}^{\phi 3} \text{rad\_out}(\phi 3) \cdot 2\pi \cdot \sin(\phi 3) d\phi 3}{\int_{\phi 3\_MIN}^{\phi 3\_MAX} \text{rad\_out}(\phi 3) \cdot 2\pi \cdot \sin(\phi 3) d\phi 3}$$

where, phi1_MIN and phi1_MAX are the lower and upper polar angle limits respectively of light collected by each lens defined by the equations;

phi3_MIN and phi3_MAX are the lower and upper limits respectively of a predetermined specified output light intensity distribution for each lens defined by the equations;

rad_in(phi1) is the light intensity distribution of the light source (e.g., LED) for which the lens is designed; and rad_out(phi3) is the predetermined specified output light intensity distribution for each lens defined by the equations;

phi2 is a polar angular coordinate of the second lens surface and is given by:

$$\phi 2 = \phi 1 + \arcsin\left(\frac{n1\sin(\%1)}{(-n2\cos(\%1)+n1)\sqrt{\frac{n2^2\sin(\%1)^2}{(-n2\cos(\%1)+n1)^2}+1}}\right) - \arctan\left(\frac{n2\sin(\%1)}{-n2\cos(\%1)+n1}\right) -$$

$$\arcsin\left(r1(\phi 1)\sin\left(\arcsin\left(\frac{(n1\sin(\%1))}{\left((-n2\cos(\%1)+n1)\sqrt{\frac{n2^2\sin(\%1)^2}{(-n2\cos(\%1)+n1)^2}+1}\right)}\right) - \arctan\left(\frac{n2\sin(\%1)}{n2\cos(\%1)+n1}\right)\right)\right) / r2(\phi 1)$$

EQU. 3

$$\%1: = -\frac{1}{2}\phi 1 + \frac{1}{2}\phi 3(\phi 1)$$

and $$\frac{\partial \phi 3}{\partial \phi 1} = \left(\frac{\text{rad\_in}(\phi 1) \cdot 2\pi \cdot \sin(\phi 1)}{\text{rad\_out}(\phi 3) \cdot 2\pi \cdot \sin(\phi 3)}\right) \cdot \left(\frac{\int_{\phi 3\_MIN}^{\phi 3\_MAX} \text{rad\_out}(\phi 3) \cdot 2\pi \cdot \sin(\phi 3) d\phi 3}{\int_{\phi 1\_MIN}^{\phi 1\_MAX} \text{rad\_in}(\phi 1) \cdot 2\pi \cdot \sin(\phi 1) d\phi 1}\right)$$

EQU. 4 with initial conditions r1_ini and r2_ini for r1(phi1) and r2(phi1) respectively EQU. 2 is solved numerically for to obtain a value of phi3 for each input value of phi1 and DE1 and DE2 are integrated numerically, e.g., using the Runge Kutta integrator.

If phi1_min=phi3_min=0, EQU. 4 will be undefined at phi1_min=0. In this case, instead of using EQU. 4 one can use the values of phi3 obtained from EQU. 2 at two closely spaced points (e.g., spaced by 0.001) to obtain a finite difference approximation to dphi3/dphi1.

where, n1, n2 phi1, phi3 are as defined above;

r2_d1 is the polar radial coordinate of the redefined portion 2112 of the second lens surface 2104;

phiD is the constant draft angle of the portion 2108 of the first surface 2102, measured in a clockwise direction from the Z-axis, so that practical draft angles will be negatively valued, e.g., −5 degrees;

phi1_phiD is the value of phi1 at phiD on the first surface defined by DE1;

$$\frac{\partial}{\partial \phi 1}\text{r2\_d1} = \text{r2\_d1}(\phi 1)\tan\left(\arctan\left(\frac{n1\cos(\phi 3 - phiD + \%2)}{n1\sin(\phi 3 - phiD + \%2) - n2}\right) - \arcsin\left(\frac{\text{r1\_switch } \%4 \; \%3}{\%1\text{r2\_d1}(\phi 1)}\right)\right)$$

DE 4

$$\left(\left(\frac{n1\sin(\phi 1 - phiD)}{n2\sqrt{1 - \frac{n1^2\cos(\phi 1 - phiD)^2}{n2^2}}} - \frac{\text{r1\_switch } \%4 \; \%3(-\tan(phiD)\sin(\phi 1) - \cos(\phi 1))}{\%1^2 \text{r2\_d1}(\phi 1)} - \right.\right.$$

$$\left.\text{r1\_switch } \%4\sin(\phi 1 - phiD + \%2)\frac{\left(1 - \frac{n1\sin(\phi 1 - phiD)}{n2\sqrt{1 - \frac{n1^2\cos(\phi 1 - phiD)^2}{n2^2}}}\right)}{\%1\text{r2\_d1}(\phi 1)}\right) / \sqrt{1 - \frac{\text{r1\_switch}^2 \; \%4^2 \; \%3^2}{\%1^2 \text{r2\_d1}(\phi 1)^2}} \bigg/ \left(1 - \right.$$

$$\left.\tan\left(\arctan\left(\frac{n1\cos(\phi 3 - phiD + \%2)}{n1\sin(\phi 3 - phiD + \%2) - n2}\right) - \arcsin\left(\frac{\text{r1\_switch } \%4 \; \%3}{\%1\text{r2\_d1}(\phi 1)}\right)\right)\text{r1\_switch } \%4 \; \%3 \bigg/ \left(\text{r2\_d1}(\phi 1) \; \%1\sqrt{1 - \frac{\text{r1\_switch}^2 \; \%4^2 \; \%3^2}{\%1^2 \text{r2\_d1}(\phi 1)^2}}\right)\right)$$

$\%1: = \tan(phiD)\cos(\phi 1) - \sin(\phi 1)$ $\%2: = \arcsin\left(\frac{n1\cos(\phi 1 - phiD)}{n2}\right)$ $\%3: = \cos(\phi 1 - phiD + \%2)$ $\%4: = \tan(phiD)\cos(phi1\_phiD) - \sin(phi1\_phiD)$ r1_switch is the polar radial coordinate of the point on the first surface 2102 at which the switch is made to the constant draft portion 2108, i.e., r1(phi1_phiD)=r1_switch. Although DE4 is defined in the domain of phi1, the polar angular coordinate phi2 of the redefined portion 2112 is given by:

$$\text{phi2\_d1} = \frac{1}{2}\pi + phiD - \arcsin\left(\frac{n1\cos(\phi1 - phiD)}{n2}\right) - $$

$$\arcsin\Biggl( \text{r1\_switch}(\tan(phiD)\cos(\text{phi1\_phiD}) - \sin(\text{phi1\_phiD}))$$

$$\cos\left(\phi1 - phiD + \arcsin\left(\frac{n1\cos(\phi1 - phiD)}{n2}\right)\right) \Bigg/ $$

$$((\tan(phiD)\cos(\phi1) - \sin(\phi1))\text{r2\_d1}(\phi1)) \Biggr)$$

EQU. 5

Cartesian coordinate of the redefined portion can be obtained from r2_d1 and phi2_d1.

In order to find the value of phi1 at which the inner lens surface has an angle equal to a desired draft the following equation is used:

$$phiD = \phi1 - \frac{\pi}{2} - \theta1 \qquad \text{EQU. 6}$$

where theta_1 is the angle of incidence of ideal rays on the first surface and is given by:

$$\theta1 := -\arctan\left(\frac{n2\sin\left(-\frac{1}{2}\phi1 + \frac{1}{2}\phi3(\phi1)\right)}{n2\cos\left(-\frac{1}{2}\phi1 + \frac{1}{2}\phi3(\phi1)\right) - n1}\right) \qquad \text{EQU. 7}$$

EQU. 6 (with theta_1 defined by EQU. 7) is used by plugging in a selected value for phiD (e.g., −½ to minus a few degrees) and using a root finding method to find the value of phi1 that balances EQU. 6. Table II below list information for the lens shown in FIG. 21

TABLE II

| | |
|---|---|
| Phi1_MIN | 0.0 radians |
| Phi1_MAX | 1.57 radians (90 degrees) |
| Phi3_MIN | 0.0 radians |
| Phi3_MAX | 1.57 radians (90 degrees) |
| PhiD | −0.087 radians (−5.0 degrees) |
| Phi1_phiD | 1.13 radians (64.7 degrees) |
| rad_in(phi1) | Quasi Lambertian measured data |
| rad_out(phi3) | 1.0 (uniform goal) |
| r1_ini | 3.0 |
| r2_ini | 4.0 |
| n1 | 1.0 |
| n2 | 1.497 (PMMA) |
| Phi_start | Phi1_min |
| Calculated Transmission | 92.19% |

Phi_start is the angle at which the initial conditions are specified.

Due to, at least, the finite size of LEDs and edge effects the lenses will not produce perfect fidelity to the intended light distribution (rad_out). One way to improve fidelity is to measure the actual distribution produced by the lenses and make successive prototypes where rad_out in the above equation is adjusted by subtracting a function of phi2 or phi3 (the output domain variable), that represents the error between the intended distribution rad_out and the actual measured data. Thus rad_out as it appears above, used to make an $N^{TH}$ prototype lens, would be replaced by:

$$\text{rad\_out}(\phi p) - \sum_{i=1}^{N-1} \text{Error}_i(\phi p) \qquad \text{EQU. 8}$$

where φp stands for φ2 in the case of DE1 and φ3 in the case of DE2-DE4, and $\text{Error}_i$ is just the difference between the measured distribution and rad_out for an $i^{TH}$ prototype after both have been normalized to the same integrated power. $\text{Error}_i$ is conveniently represented as a cubic-spline. In establishing $\text{Error}_i$ measurements at positive and negative angles φ will be averaged together because rotational symmetry is assumed.

In making such corrections the error at the maximum value of φp (e.g., the error based on measurements at ±90° can be ignored by setting $\text{Error}_i(\phi p\_max)=0.0$. In this way, no attempt will be made to counteract the edge effect which will be accepted.

Figure 22:
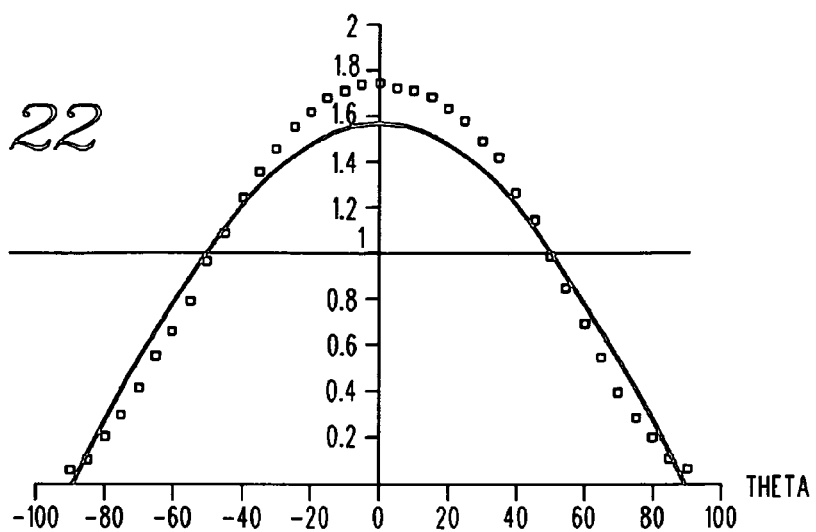
FIG. 22 is a graph showing the radiant light intensity versus polar angle for an LED that produces a quasi-Lambertian light distribution as a series of measured data points along with a plot of the Lambertian distribution.
Figure 23:
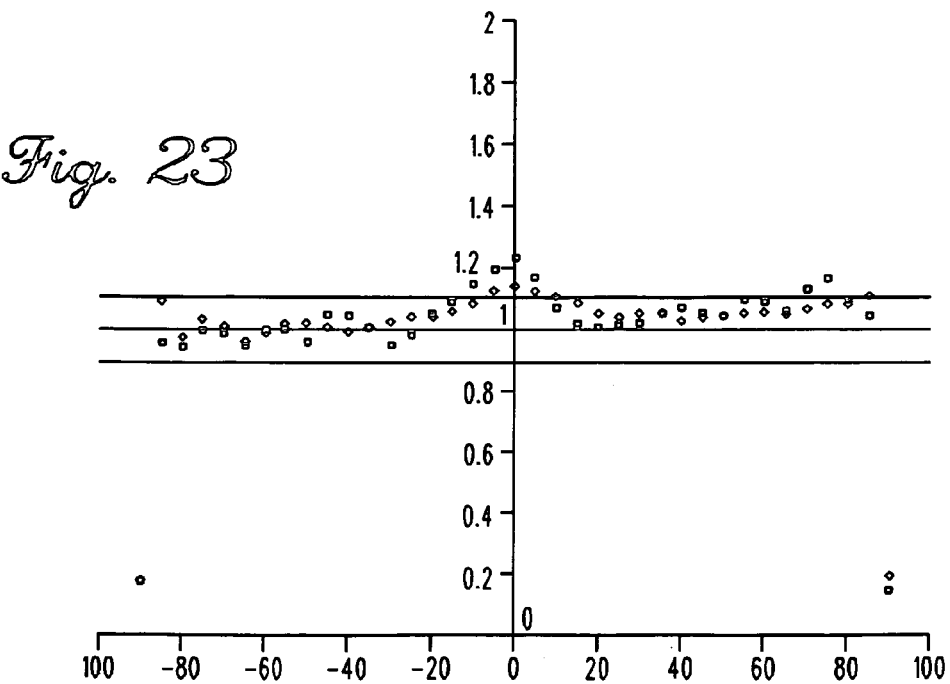
FIG. 23 is a graph of radiant light intensity versus polar angle produced using an LED having the distribution shown in FIG. 22 in combination with a lens of the type shown in FIG. 21.

FIG. 22 is a graph showing the radiant light intensity versus polar angle for an LED that produces a quasi-Lambertian light distribution as a series of measured data points along with a plot of the Lambertian distribution. In FIGS. 22-23 the abscissa indicates polar angle in degrees and the ordinate indicates radiant light intensity in relative units. The Lambertian distribution which theoretically applies to a flat diffuse light emitter is simply cos(φ). The measured data is taken from a white XPC LED manufactured by Cree of Durham, N.C. As can be seen the distribution produced by the actual LED is nearly Lambertian and is termed 'quasi-Lambertian'. Both were normalized to have an average of unity. The Standard Deviation of the measured distribution is 0.59 and the average absolute value deviation is 0.53. If bare LEDs producing such distribution were used in the omnidirectional LED light bulbs described herein the light distribution produced would be highly non-uniform. In the present context the average absolute value deviation is defined as the average of values measured at 5° intervals starting at a polar angle of −90° and ending at polar angle of 90°.

FIG. 23 is a graph showing the radiant intensity versus polar angle for the XPC LED with two prototypes of a lens of the type shown in FIG. 21 designed to produce a uniform light distribution. The first light distribution represent by the box-shaped points was for the first prototype with rad_out simply set to unity. The second distribution represent by the diamond-shaped points was for a second prototype with rad_out replaced given by EQU 8 with the error term based on measurements of the first prototype. Both light distributions were normalized to a mean value of unity as in the case of the quasi-Lambertian distribution shown in FIG. 22. The standard deviation for the first prototype is 0.210 and the standard deviation for the second prototype is 0.197. The respective average absolute value deviations are 0.104 and 0.0922. Significantly the central intensity maximum of the second prototype was reduced to 14% above average compared to 22% above average for the first prototype. The lines on the graph are at the 90% and 110% of average levels. Further improvement in uniformity may be obtainable with further prototypes defined using EQU. 8. In any case the uniformity is much improved compared to the distribution produced by the bare LED as shown in FIG. 22. The light distributions are sufficiently uniform that the enhancement in uniformity brought by using a diffusive bulb shaped cover is not needed in many cases and in certain embodiments the bulb shape cover need not be used. Generally it is preferable to have the average absolute value deviation of below 0.25 more preferably below 0.15 (measured with the data normalized to an average value of 1.0). The average absolute value deviation, as discussed herein, is computed using the following formula:

$$AvgAbsDev = \frac{1}{37}\sum_{i=1}^{37} \text{abs}(RadOutMeas_i - 1) \quad \text{EQU. 9}$$

$RadOutMeas_i$ are 37 normalized measurements of light intensity taken at 5° spacing of polar angle φ from −90° to 90°. The measurements are normalized so that their average is equal to 1.0.

Figure 24:
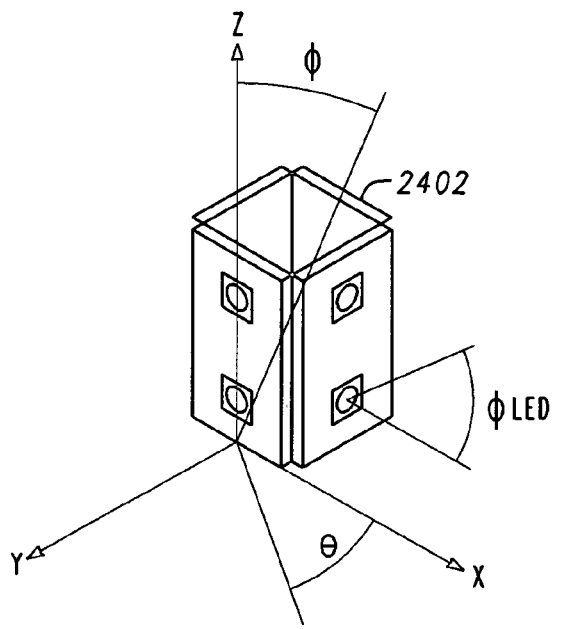
FIG. 24 schematically illustrates the geometry of the LED support/heatsinks used in the omnidirectional LED bulbs in a coordinate system.

FIG. 24 schematically illustrates a LED support/heat sink 2402 as described above in a coordinate system. This is useful in understanding how the LEDs equipped with the lenses described above will illuminate the full 4Pi Steradian solid angle about the bulbs in a highly uniform manner. Note that the Z-axis of the coordinate system is parallel to the longitudinal axis of the bulbs. Note also that the optical axis of the LEDs (axis of symmetry of the emission pattern of the LEDs) labeled N is perpendicular to the Z-axis.

Figure 25:
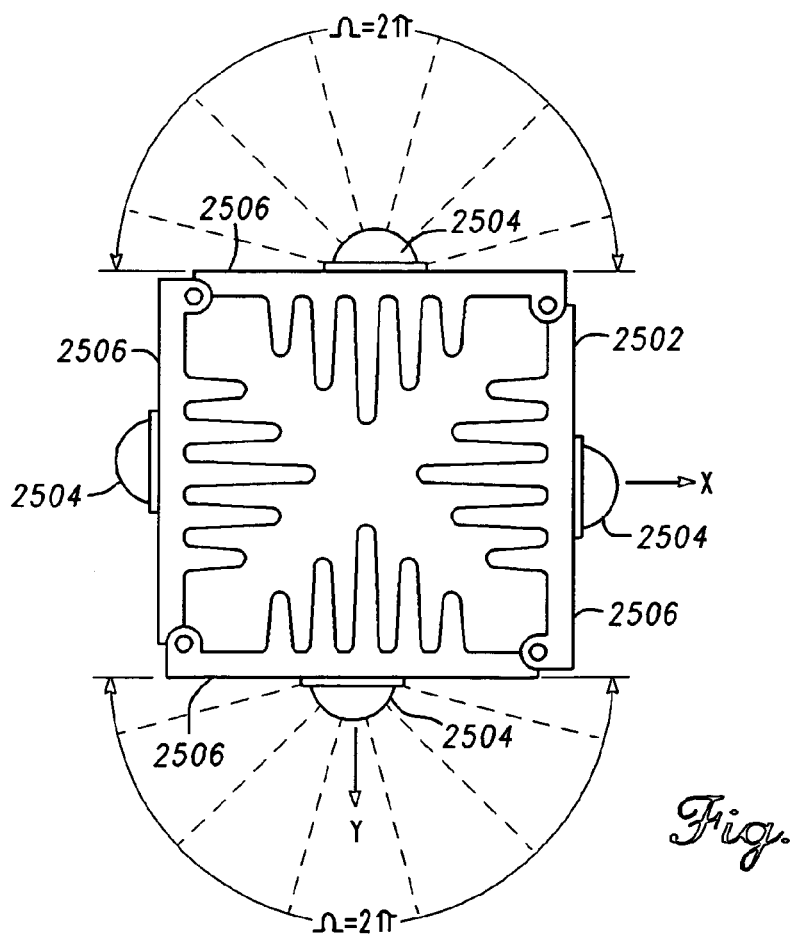
FIG. 25 shows an end view of the LED support/heatsink with a schematic illustration of the manner in which the solid angle about the omnidirectional bulbs is illuminated.

FIG. 25 shows an end view of an LED support/heatsink 2502 of the design described above. The cross-sectional shape is square meaning that it has 2-fold rotation symmetry (as well as fourfold) There are four LEDs 2504 shown (more may be used) on four faces 2506. The faces 2506 are oriented 90 degrees apart in azimuthal angle θ (see FIG. 24), e.g., at 0°, 90°, 180°, 270°. Each LED is equipped with a lens of the type shown in FIG. 20 or FIG. 21 and described by DE1 or DE2-DE4, so that each LED illuminates a full hemisphere of 2π Steradian with a light distribution that is relatively uniform, i.e. a light distribution that has an average absolute value deviation below 0.25 and more preferably below 0.15. The arrangement of LEDs can be described as including two pairs with each pair including two LEDs that face in opposite direction. Thus, each pair including two LEDs that face in opposite directions will illuminate the full 4π Steradian solid angle around the bulb and the two pairs together will cover the full 4π Steradian solid angle twice over. In this case, only in a very small polar angle range (in the bulb coordinate system shown in FIG. 24) will the low intensity in the small (<5°) interval near phi=90° shown in FIG. 23 not be mitigated by being combined with higher intensity light from an LED on another face 2506. Other LED support/heat sinks that have 2n-fold symmetry where n is an integer can also provide redundant coverage of the full 4π Steradian solid angle while still providing a high degree of azimuthal uniformity.

While the invention has been described above with reference to particular embodiments shown in the figures and described above, the invention should not be construed as limited by these particular embodiments.

What is claimed is:

1. An omnidirectional LED light bulb comprising:
a first LED oriented to face a first direction;
a second LED oriented to face a second direction;
a first lens optically coupled to said first LED;
a second lens optically coupled to said second LED;
wherein said first lens comprises at least one surface shaped to redirect light from said first LED so as to redistribute said light from said first LED to produce a light distribution that has a first average absolute value deviation of less than 0.53 from a normalized mean intensity of 1.0 within a first solid angle of 2π steradian;
wherein said second lens comprises at least one surface shaped to redirect light from said second LED so as to redistribute said light from said second LED to produce a light distribution that has a second average absolute value deviation of less than 0.53 from a normalized mean intensity of 1.0 within a second solid angle of 2π steradian.

2. The omnidirectional LED light bulb according to claim 1 further comprising:
a base;
a lower housing coupled to said base;
a hollow body coupled to said lower housing, said hollow body comprising at least one external surface, a first opening disposed proximate and in spaced relation to said lower housing, a second opening, and a plurality of inwardly extending heat sink fins;
wherein said first opening is separated from said lower housing by at least an open space that is contiguous with an ambient environment;
wherein said first LED and said second LED are mounted on said at least one external surface between said first opening and said second opening, whereby heat generated by operating said first LED and said second LED is conducted to said plurality of inwardly extending heat sink fins and is removed by convective air flow that enters and exits said hollow body through said first opening and said second opening.

3. The omnidirectional LED light bulb according to claim 2 wherein:
said hollow body is coupled to said base by an assembly that comprises a stem and an "X" shaped brace.

4. The omnidirectional LED light bulb according to claim 2 comprising:
a lower assembly comprising said base and said housing, wherein said lower assembly encloses a circuit board including an LED driver circuit.

5. The omnidirectional LED light bulb according to claim 2 wherein said hollow body is an aluminum extrusion.

6. The omnidirectional LED light bulb according to claim 5 wherein said first opening and said second opening are ends of said extrusion.

7. The omnidirectional LED light bulb according to claim 2 wherein said hollow body has a polygonal external cross sectional shape and said at least one external surface comprises a plurality of faces.

8. The omnidirectional LED light bulb according to claim 7 wherein said hollow body has a square external cross sectional shape and said at least one external surface comprises four faces.

9. The omnidirectional LED light bulb according to claim 2 further comprising a bulb shaped cover disposed over said hollow body.

10. The omnidirectional LED light bulb according to claim 9 wherein said bulb shaped cover is made from a diffusive plastic.

11. The omnidirectional LED light bulb according to claim 10 wherein said cover comprises a first cover opening and a second cover opening and wherein said first opening of said cover is proximate said first opening of said hollow body, said second opening of said cover is proximate said second opening of said hollow body, and said first opening of said cover is disposed proximate and in spaced relation to said housing.

12. The omnidirectional LED light bulb according to claim 9 wherein said bulb shaped cover is shaped to intercept light emitted by said first LED and said second LED and is mounted over said hollow body in a manner such that gaps are left between said hollow body and said bulb shaped cover that allow air to flow through said bulb shaped cover proximate said external surface.

13. The omnidirectional LED light bulb according to claim 9 wherein said bulb shaped cover includes a phosphor.

14. The omnidirectional LED light bulb according to claim 2 wherein said hollow body comprises a plurality of segments that fit together.

15. The omnidirectional LED light bulb according to claim 14 wherein said plurality of segments are aluminum extrusions.

16. The omnidirectional LED light bulb according to claim 2 wherein said first opening is proximal to said base and said second opening is distal from said base.

17. The omnidirectional LED light bulb according to claim 2 wherein said base is an Edison type base.

18. The omnidirectional LED light bulb according to claim 1 wherein said first average absolute value deviation is less than 0.25 and said second average absolute value deviation is less than 0.25.

19. The omnidirectional LED light bulb according to claim 18 wherein said first LED and said second LED face in opposite directions.

20. The omnidirectional LED light bulb according to claim 19 wherein said first average absolute value deviation is less than 0.15 and said second average absolute value deviation is less than 0.15.

21. The omnidirectional LED light bulb according to claim 18 wherein said first lens and said second lens are described by a differential equation DE1:

$$\frac{\partial}{\partial \phi 1} r1 = \frac{r1 n2 \sin(\phi 2 - \phi 1)}{-n2\cos(\phi 2 - \phi 1) + n1} \qquad \text{DE 1}$$

where, r1 is a radial coordinate of each lens surface defined by DE1;

phi1 is a polar angle coordinate of each lens surface, and is also the domain variable over which the differential equation DE1 is defined;

n1 is an index of refraction of each lens defined by DE1;

n2 is an index of refraction of a surrounding medium; and phi2 is a polar angle variable for a predetermined specified output light intensity and is given by:

$$\frac{\int_{\phi1\_MIN}^{\phi1} \text{rad\_in}(\phi 1) \cdot 2\pi \cdot \sin(\phi 1) d\phi 1}{\int_{\phi1\_MIN}^{\phi1\_MAX} \text{rad\_in}(\phi 1) \cdot 2\pi \cdot \sin(\phi 1) d\phi 1} = \frac{\int_{\phi2\_MIN}^{\phi2} \left(\text{rad\_out}(\phi 2) - \sum_{i=1}^{N-1} Error_i(\phi 2)\right) \cdot 2\pi \cdot \sin(\phi 2) d\phi 2}{\int_{\phi2\_MIN}^{\phi2\_MAX} \left(\text{rad\_out}(\phi 2) - \sum_{i=1}^{N-1} Error_i(\phi 2)\right) \cdot 2\pi \cdot \sin(\phi 2) d\phi 2} \qquad \text{EQU. 1}$$

where, phi1_MIN and phi1_MAX are a lower and an upper polar angle limit respectively of light collected by each lens defined by the differential equation DE1;

phi2_MIN and phi2_MAX are a lower and an upper polar angle limit respectively of a predetermined specified output light intensity distribution for each lens defined by the differential equation DE1;

rad_in(phi1) is a quasi lambertian light intensity distribution produced by an LED for which the lens is designed, when said LED is fitted with a hemispherical lens; and rad_out(phi2) is a predetermined specified output light intensity distribution for each lens defined by the differential equations;

$Error_i$ is a difference between a measured distribution and rad_out for an $i^{TH}$ prototype after both have been normalized to a common integrated power;

with initial conditions r1_ini for r1.

22. The omnidirectional LED light bulb according to claim 18 wherein at least a portion of said first lens and at least a portion of said second lens are described by a set of coupled differential equations DE2, DE3:

$$\frac{\partial}{\partial \phi 1} r1(\phi 1) = \frac{r1 n2 \sin\left(\frac{1}{2}\phi 1 - \frac{1}{2}\phi 3\right)}{n2\cos\left(\frac{1}{2}\phi 1 - \frac{1}{2}\phi 3\right) - n1} \qquad \text{DE 2}$$

-continued $$\frac{\partial}{\partial \phi 1} r2 = r2(\phi 1)\tan\left(\%3 - \arcsin\left(\frac{r1(\phi 1)\sin(\%4)}{r2(\phi 1)}\right)\right) \quad \text{DE 3}$$

$$\left(1 - \left(\frac{n1\cos(\%1)\ \%5}{(n2\cos(\%1)-n1)\sqrt{\%2}} + \frac{n1\sin(\%1)^2 n2\ \%5}{(n2\cos(\%1)-n1)^2 \sqrt{\%2}} - \frac{1}{2}\frac{n1\sin(\%1)\left(2\frac{n2^2\sin(\%1)\cos(\%1)\ \%5}{(n2\cos(\%1)-n1)^2} + 2\frac{n2^3\sin(\%1)^3\ \%5}{(n2\cos(\%1)-n1)^3}\right)}{(n2\cos(\%1)-n1)\ \%2^{\left(\frac{3}{2}\right)}}\right)\Bigg/$$

$$\sqrt{1 - \frac{n1^2\sin(\%1)^2}{(n2\cos(\%1)-n1)^2\ \%2}} + \frac{\frac{n2\cos(\%1)\ \%5}{n2\cos(\%1)-n1} + \frac{n2^2\sin(\%1)^2\ \%5}{(n2\cos(\%1)-n1)^2}}{\%2} - \left(\frac{\left(\frac{\partial}{\partial \phi 1}r1(\phi 1)\right)\sin(\%4)}{r2(\phi 1)} + r1(\phi 1)\cos(\%4)\right)$$

$$\left(\left(-\left(\frac{n1\cos(\%1)\ \%5}{(n2\cos(\%1)-n1)\sqrt{\%2}} + \frac{n1\sin(\%1)^2 n2\ \%5}{(n2\cos(\%1)-n1)^2 \sqrt{\%2}} - \frac{1}{2}\frac{n1\sin(\%1)\left(2\frac{n2^2\sin(\%1)\cos(\%1)\ \%5}{(n2\cos(\%1)-n1)^2} + 2\frac{n2^3\sin(\%1)^3\ \%5}{(n2\cos(\%1)-n1)^3}\right)}{(n2\cos(\%1)-n1)\ \%2^{\left(\frac{3}{2}\right)}}\right)\Bigg/\right.$$

$$\left.\sqrt{1 - \frac{n1^2\sin(\%1)^2}{(n2\cos(\%1)-n1)^2\ \%2}} + \frac{\frac{n2\cos(\%1)\ \%5}{n2\cos(\%1)-n1} + \frac{n2^2\sin(\%1)^2\ \%5}{(n2\cos(\%1)-n1)^2}}{\%2}\right)\Bigg/ r2(\phi 1)\Bigg/ \sqrt{1 - \frac{r1(\phi 1)^2 \sin(\%4)^2}{r2(\phi 1)^2}}\Bigg/$$

$$\left(1 - \frac{\tan\left(\%3 - \arcsin\left(\frac{r1(\phi 1)\sin(\%4)}{r2(\phi 1)}\right)\right)r1(\phi 1)\sin(\%4)}{r2(\phi 1)\sqrt{1 - \frac{r1(\phi 1)^2\sin(\%4)^2}{r2(\phi 1)^2}}}\right)$$

$$\%1 := -\frac{1}{2}\phi 1 + \frac{1}{2}\phi 3(\phi 1)$$

$$\%2 := 1 + \frac{n2^2 \sin(\%\ 1)^2}{(n2\cos(\%\ 1) - n1)^2}$$

$$\%3 := \arcsin\left(\frac{n1\sin(\%\ 1)}{(n2\cos(\%\ 1) - n1)\sqrt{\%\ 2}}\right)$$

$$\%4 := -\%\ 3 + \arctan\left(\frac{n2\sin(\%\ 1)}{n2\cos(\%\ 1) - n1}\right)$$

$$\%5 := -\frac{1}{2} + \frac{1}{2}\left(\frac{\partial}{\partial \phi 1}\phi 3(\phi 1)\right)$$

Where:
n2 is an index of refraction of each lens defined by the differential equations DE2, DE3;
n1 is an index of refraction of a surrounding medium;
phi1 is a polar angular coordinate of a first lens surface;
phi3 is a polar angle of a ray emitted at a coordinate system origin that was initially emitted at angle phi1 after the ray has left a second surface of each lens defined by the equations DE2, DE3 and is given by:

$$\frac{\int_{\phi 1\_MIN}^{\phi 1} \text{rad\_in}(\phi 1) \cdot 2\pi \cdot \sin(\phi 1) d\phi 1}{\int_{\phi 1\_MIN}^{\phi 1\_MAX} \text{rad\_in}(\phi 1) \cdot 2\pi \cdot \sin(\phi 1) d\phi 1} =$$

where,
phi1_MIN and phi1_MAX are a lower and an upper polar angle limit respectively of light collected by each lens defined by the equations DE2, DE3;

phi3_MIN and phi3_MAX are a lower and an upper polar angle limit respectively of a predetermined specified output light intensity distribution for each lens defined by the equations DE2, DE3;

EQU. 2

$$\frac{\int_{\phi 3\_MIN}^{\phi 3}\left(\text{rad\_out}(\phi 3) - \sum_{i=1}^{N-1} Error_i(\phi 3)\right) \cdot 2\pi \cdot \sin(\phi 3) d\phi 3}{\int_{\phi 3\_MIN}^{\phi 3\_MAX}\left(\text{rad\_out}(\phi 3) - \sum_{i=1}^{N-1} Error_i(\phi 3)\right) \cdot 2\pi \cdot \sin(\phi 3) d\phi 3}$$

rad_in(phi1) is a light intensity distribution of each LED for which the lenses described by DE2, DE3 are designed; and rad_out(phi3) is a predetermined specified output light intensity distribution for each lens defined by the differential equations DE2, DE3;

$Error_i$ is a difference between a measured distribution and rad_out for an $i^{TH}$ prototype after both have been normalized to a common integrated power;

phi2 is a polar angular coordinate of the second lens surface and is given by:

$$\phi 2 = \phi 1 + \arcsin\left(\frac{n1\sin(\%1)}{(-n2\cos(\%1)+n1)\sqrt{\frac{n2^2\sin(\%1)^2}{(-n2\cos(\%1)+n1)^2}+1}}\right) - \arctan\left(\frac{n2\sin(\%1)}{-n2\cos(\%1)+n1}\right) -$$

$$\arcsin\left(r1(\phi 1)\sin\left(\arcsin\left(\frac{(n1\sin(\%1))}{(-n2\cos(\%1)+n1)\sqrt{\frac{n2^2\sin(\%1)^2}{(-n2\cos(\%1)+n1)^2}+1}}\right) - \arctan\left(\frac{n2\sin(\%1)}{-n2\cos(\%1)+n1}\right)\right)\bigg/r2(\phi 1)\right)$$

EQU. 3

$\%1 := -\frac{1}{2}\phi 1 + \frac{1}{2}\phi 3(\phi 1)$ and $$\frac{\partial \phi 3}{\partial \phi 1} = \left(\frac{rad\_in(\phi 1)\cdot 2\pi\cdot \sin(\phi 1)}{\left(rad\_out(\phi 3) - \sum_{i=1}^{N-1} Error_i(\phi 3)\right)\cdot 2\pi\cdot \sin(\phi 3)}\right)\cdot\left(\frac{\int_{\phi 3\_MIN}^{\phi 3\_MAX}\left(rad\_out(\phi 3) - \sum_{i=1}^{N-1} Error_i(\phi 3)\right)\cdot 2\pi\cdot \sin(\phi 3)d\phi 3}{\int_{\phi 1\_MIN}^{\phi 1\_MAX} rad\_in(\phi 1)\cdot 2\pi\cdot \sin(\phi 1)d\phi 1}\right)$$

EQU. 4 with initial conditions r1_ini and r2_ini for r1(phi1) and r2(phi1) respectively.

23. An omnidirectional LED light bulb comprising:

a first LED facing in a first direction;

a second LED mounted facing in a second direction;

a first lens optically coupled to said first LED and a second lens optically coupled to said second LED;

a diffuser disposed around said first LED and said second LED so as to intercept light transmitted by said first lens and said second lens;

wherein said first lens and said second lens each comprise at least one surface shaped to redistribute light from said first LED and said second LED so as to reduce light intensity along respective optical axes of said first LED and said second LED and to reduce light intensity in a polar angle range below a predetermined polar angle defined with respect to optical axes of said first LED and said second LED and serve to increase light intensity in a polar angle range above said predetermined angle; and wherein at least said diffuser, said first lens and said second lens serve to create a light distribution that is substantially azimuthally uniform with respect to an azimuth angle defined about a longitudinal axis of said omnidirectional LED light bulb.

* * * * *